United States Patent
Kido et al.

(10) Patent No.: US 7,222,019 B2
(45) Date of Patent: May 22, 2007

(54) VEHICLE IMAGE DISPLAY APPARATUS AND VEHICLE HAVING THE SAME

(75) Inventors: Toru Kido, Shizuoka (JP); Gen Mizutani, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 33 days.

(21) Appl. No.: 11/032,908

(22) Filed: Jan. 11, 2005

(65) Prior Publication Data
US 2005/0197765 A1    Sep. 8, 2005

(30) Foreign Application Priority Data
Jan. 14, 2004    (JP) ............... 2004-006986

(51) Int. Cl.
*G01C 21/30*    (2006.01)
(52) U.S. Cl. ............... 701/211; 701/212; 340/438; 340/439
(58) Field of Classification Search ............... 701/200, 701/211, 212, 220, 224, 300; 340/425.5, 340/438, 439
See application file for complete search history.

(56) References Cited

U.S. PATENT DOCUMENTS

| | | | |
|---|---|---|---|
| 6,249,720 B1 | 6/2001 | Kubota et al. | |
| 6,400,405 B2 * | 6/2002 | Tomida et al. | 348/333.05 |
| 6,659,245 B1 * | 12/2003 | Lee | 188/354 |
| 6,836,710 B2 * | 12/2004 | Yamaki | 701/33 |
| 2004/0172172 A1 | 9/2004 | Kubota et al. | |

FOREIGN PATENT DOCUMENTS

| | | |
|---|---|---|
| JP | 11-259271 | 9/1999 |
| JP | 11-272640 | 10/1999 |
| JP | 2000-283771 | 10/2000 |
| JP | 2001-219796 | 8/2001 |
| JP | 2002-104103 | 4/2002 |
| JP | 2003-104136 | 4/2003 |
| JP | 2004-28702 | 1/2004 |

* cited by examiner

*Primary Examiner*—Gertrude A. Jeanglaude
(74) *Attorney, Agent, or Firm*—Keating & Bennett, LLP

(57) ABSTRACT

A vehicle image display apparatus includes a traveling condition judging unit for repeatedly judging the traveling condition of a vehicle, an operating unit for generating a parameter for abstractly representing the traveling condition of the vehicle based on the previous traveling condition and the current traveling condition currently judged by the traveling condition judging unit, and a display unit for displaying an image which biologically represents the traveling condition of the vehicle based on the parameter generated by the operating unit. The parameter for abstractly representing the traveling condition of the vehicle includes, for example, a hard/easy parameter representing a hard/easy condition.

16 Claims, 19 Drawing Sheets

FIG. 5

| CONDITION TO BE DETECTED | CHANGE AMOUNT (ADDING/ SUBTRACTING VALUE) |
|---|---|
| STROKED | +2 |
| OFTEN TRAVELING AREA | +1 |
| BRIGHT SURROUNDING | +1 |
| FULL GASOLINE TANK | +1 |
| SMALL GASOLINE RESIDUAL QUANTITY | -1 |
| DARK SURROUNDING | -1 |
| NEVER TRAVELED AREA | -1 |
| FALLEN | -2 |

FIG. 6

| CONDITION TO BE JUDGED | CHANGE AMOUNT (ADDING/ SUBTRACTING VALUE) |
|---|---|
| STEEP DOWNWARD SLOPE DESCENDING | +2 |
| PUSHING & WALKING | +1 |
| GENTLE DOWNWARD SLOPE DESCENDING | +1 |
| GENTLE UPWARD SLOPE ASCENDING | -1 |
| STEEP UPWARD SLOPE ASCENDING | -2 |
| LEGAL MAXIMUM SPEED TRAVELING | -2 |

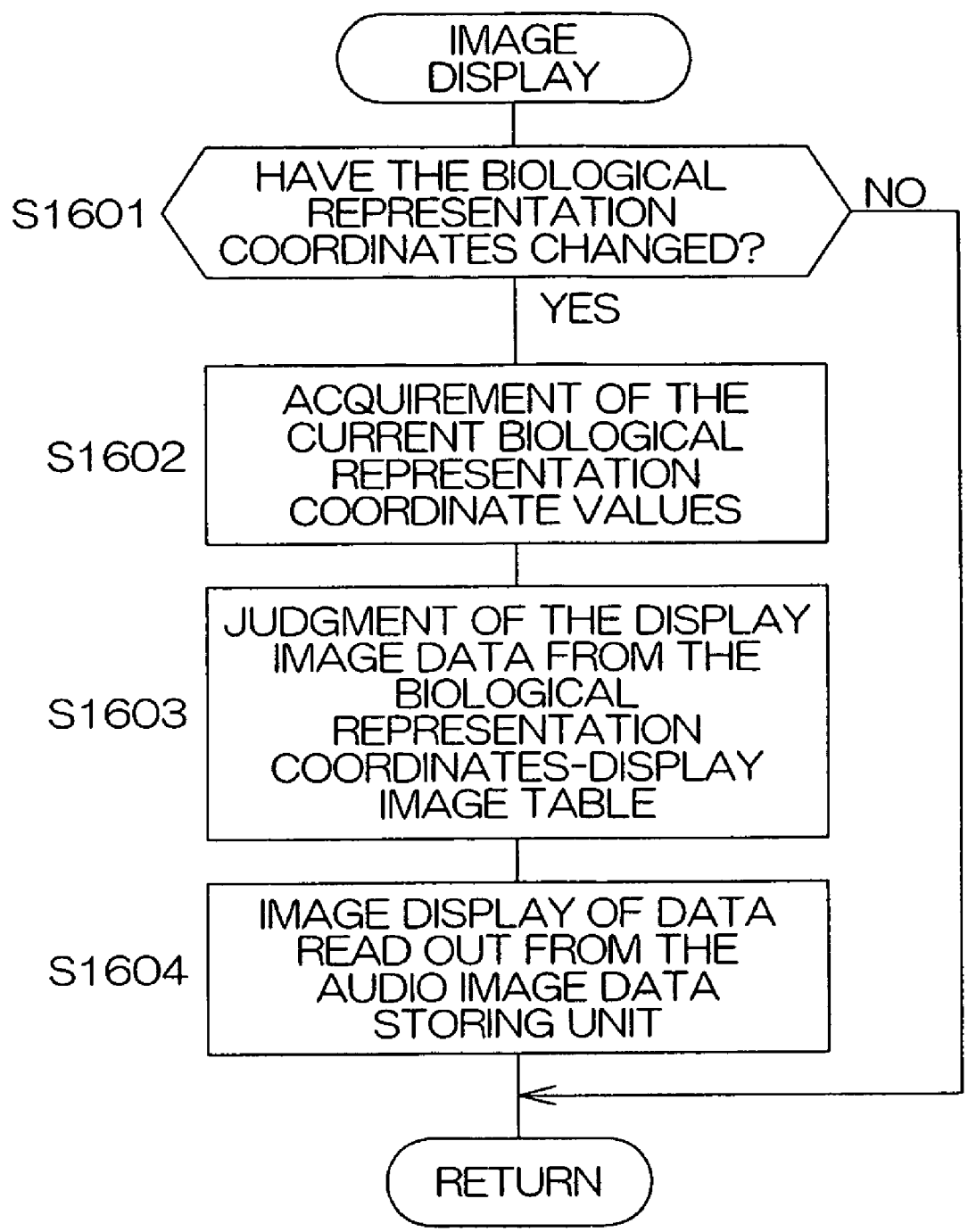

FIG. 17A  HARD (FAST EXPANSION AND CONTRACTION)
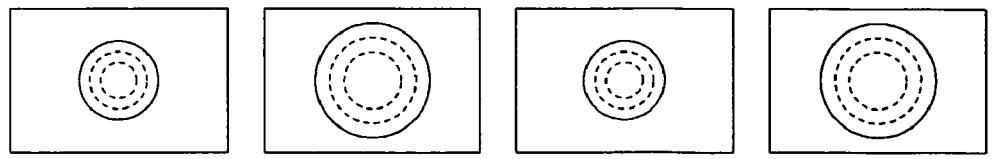
FIG. 17B  EASY (SLOW EXPANSION AND CONTRACTION)
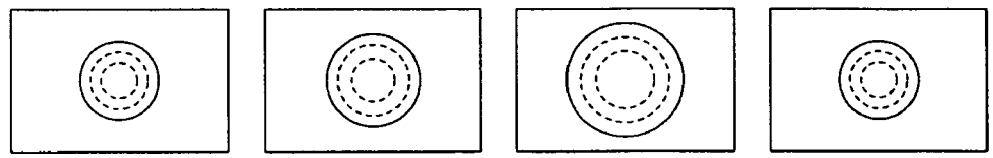
FIG. 17C  HARD (FAST EXPANSION AND CONTRACTION OF LARGE SPHERICAL BODY)
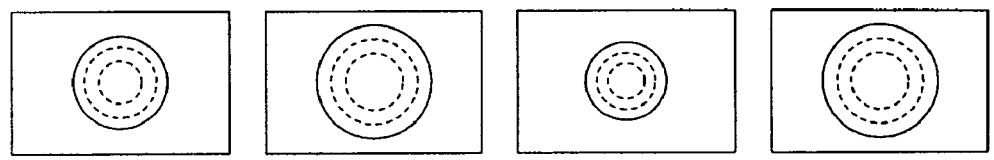
FIG. 17D  EASY (SLOW EXPANSION AND CONTRACTION OF SMALL SPHERICAL BODY)
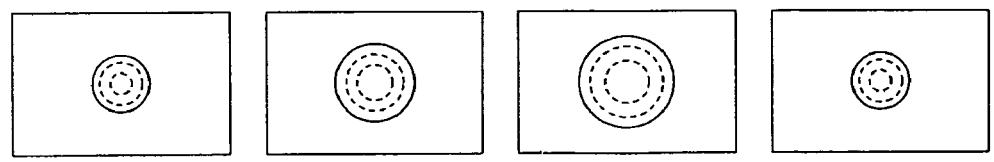

EASY (A SPHERICAL BODY BOUNDS IN
THE BACK AND FORTH DIRECTION)

HARD (A CIRCLE BODY REPEATEDLY FLICKERS
IN THE FORM OF A RING AT SHORT CYCLES)

FIG. 19A  ANXIETY (RED)
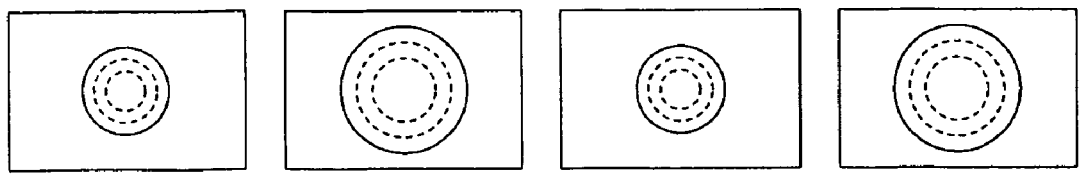
FIG. 19B  COMFORTABLE (BLUE)
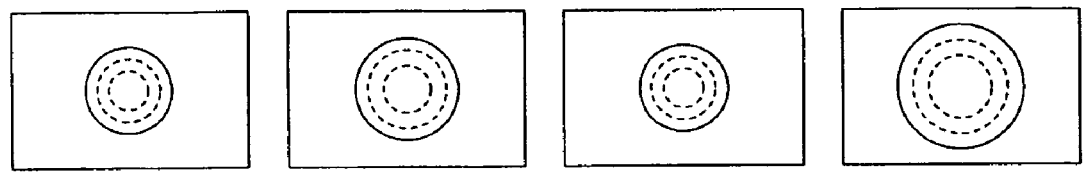
FIG. 19C  NORMAL (LIGHT BLUE)
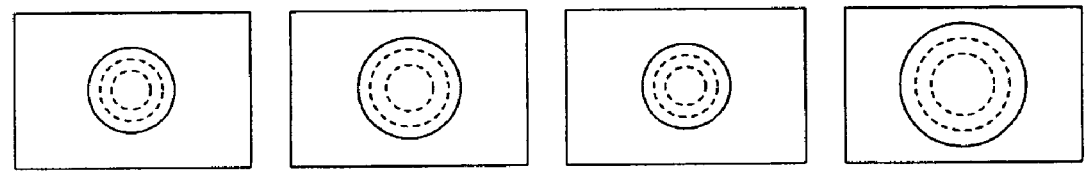

FIG. 20A       STRONG ANXIETY
(CIRCULAR MOVEMENT - LARGE ORBIT)
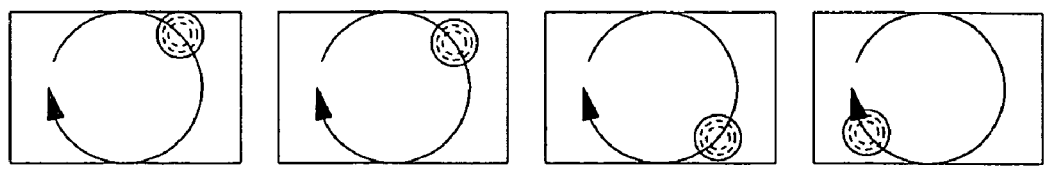
FIG. 20B       WEAK ANXIETY
(CIRCULAR MOVEMENT - SMALL ORBIT)
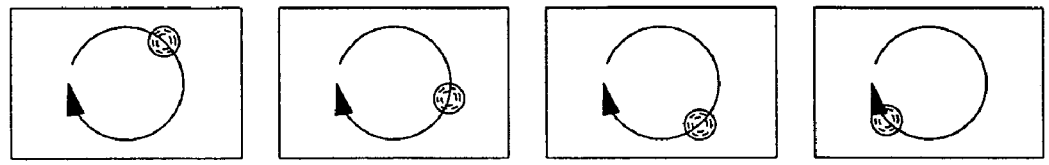

VEHICLE IMAGE DISPLAY APPARATUS AND VEHICLE HAVING THE SAME

BACKGROUND OF THE INVENTION

1. Field of the Invention

The present invention relates to a vehicle image display apparatus and more particularly to a vehicle image display apparatus arranged to display an image which abstractly or symbolically represents the vehicle condition. Further, the present invention relates to a vehicle having a vehicle image display apparatus of the type mentioned above.

2. Description of Related Art

To maintain communication between a vehicle and a driver, a conventional apparatus enables the driver to recognize information concerning the vehicle condition, road conditions and the like through a sound or an image of a pseudo-living matter such as a character or the like.

Examples of the apparatus mentioned above include a vehicle communication apparatus disclosed in Japanese Unexamined Patent Publication (KOKAI) No. 2001-219796. According to this vehicle communication apparatus, the intention and feeling of a pseudo-living matter are expressed by controlling the operations of the functional component elements mounted on the vehicle according to the traveling condition, the user's operating condition and the like.

Further, the Japanese Unexamined Patent Publication (KOKAI) No. 11-259271 (1999) discloses an agent apparatus arranged to maintain communication between a vehicle and the driver by controlling an agent image and sound according to the vehicle condition, the user's favorite conditions and the like.

However, the vehicle communication apparatus disclosed in Japanese Unexamined Patent Publication (KOKAI) No. 2001-219796, is arranged such that the condition for expressing the intention or feeling of the pseudo-living matter and the functional component element operational mode, are set to correspond to each other on a 1:1 basis. Accordingly, such a representation is disadvantageously monotonous for the vehicle feeling expression. Further, the agent apparatus disclosed in Japanese Unexamined Patent Publication (KOKAI) No. 11-259271 is disadvantageously difficult to be realized because of complications in the control system such as tables, control programs and the like for controlling the agent image and sound.

SUMMARY OF THE INVENTION

In order to overcome the problems described above, preferred embodiments of the present invention provide a vehicle image display apparatus capable of achieving, with simple processing, an abstract or symbolic representation according to the vehicle condition and traveling condition of a vehicle.

Other preferred embodiments of the present invention provide a vehicle having an image display apparatus of the type mentioned in the previous paragraph.

A vehicle image display apparatus according to a preferred embodiment of the present invention includes a traveling condition judging unit that is arranged to repeatedly judge the traveling condition of a vehicle at certain time intervals, an operating unit that is arranged to generate a parameter for abstractly or symbolically (e.g., biologically, and preferably, anthropomorphically) representing the traveling condition of the vehicle based on the previous traveling condition of the vehicle and the current traveling condition currently judged by the traveling condition judging unit, and a display unit that is arranged to display an image which abstractly represents the traveling condition of the vehicle based on the parameter generated by the operating unit.

According to the unique arrangement of the preferred embodiment described above, there can be displayed, with simple processing, an abstract traveling condition representative image that varies according to changes in traveling condition of the vehicle. As a result, the driver can easily recognize the traveling condition of the vehicle in a fully sensory manner. Further, in the case that the traveling condition of the vehicle is represented in the form of a pseudo-living matter, it enables the vehicle owner to become personally and emotionally attached to the vehicle. More specifically, a parameter which reflects the record of the past traveling condition of the vehicle is used. It is therefore possible to represent, with the use of this parameter, an image close to what living matter (particularly, an animal such as a human being) is feeling. As a result, the vehicle user tends to have a strong affinity toward the vehicle represented in the form of a pseudo-living matter.

The previous traveling condition of the vehicle is preferably expressed by the parameter value prior to the determination of the current traveling condition. Accordingly, the operating unit may generate, based on the previous parameter and the result of the determination of the current traveling condition, a parameter representing the current traveling condition of the vehicle.

The parameter for abstractly representing the traveling condition of the vehicle may include a hard/easy parameter representing a hard/easy condition. In this case, the vehicle image display apparatus preferably further includes a hard/easy parameter change amount setting unit that is arranged to set a hard/easy parameter change amount (increasing/decreasing value) corresponding to the traveling condition judged by the traveling condition judging unit. Preferably, the operating unit acquires from the hard/easy parameter change amount setting unit a hard/easy parameter change amount corresponding to the current traveling condition judged by the traveling condition judging unit, and then generates the hard/easy parameter change amount thus acquired and the previous hard/easy parameter, thereby generating a hard/easy parameter representing the current traveling condition. Preferably, the display unit displays a vehicle hard/easy condition representing image based on the hard/easy parameter generated by the operating unit.

According to the unique arrangement of the preferred embodiment described above, an image representing a hard/easy condition of the vehicle can be displayed, with simple processing, according to the traveling condition of the vehicle, enabling the traveling condition of the vehicle to be represented biologically.

Preferably, the traveling condition judged by the traveling condition judging unit preferably includes at least one of a pushing and walking condition, a downward slope traveling condition, an upward slope traveling condition, and a legal maximum speed condition, for example.

The traveling condition judging unit may be arranged to judge the downward slope traveling condition as being divided into a relatively gentle downward slope traveling condition and a relatively steep downward slope traveling condition. The traveling condition judging unit may also be arranged to judge the upward slope traveling condition as being divided into a relatively gentle upward slope traveling condition and a relatively steep upward slope traveling condition.

Preferably, the judgment of the pushing and walking condition is made particularly on a saddle-type vehicle (of the type in which the driver sits a straddle of a vehicle, such as a motorcycle, an all terrain vehicle, etc.) of which a typical example includes a two-wheeled vehicle. The traveling condition may be judged as the pushing and walking condition when certain conditions, for example, such as the accelerator opening degree being zero, whether the driver has taken his/her seat, and the vehicle speed being less than a predetermined value (e.g., about 3 km/h), are satisfied.

The traveling condition may be judged as the downward slope traveling condition or the upward slope traveling condition, for example, by comparing a speed change per unit time (i.e., acceleration) with a predetermined threshold. Accordingly, an output of a speed sensor for detecting the vehicle speed, or an output of an acceleration sensor for detecting the vehicle acceleration, may be used for judgment of the downward slope traveling condition and the upward slope traveling condition.

The vehicle image display apparatus may further include a vehicle condition detecting unit that is arranged to detect a vehicle condition. In this case, the traveling condition judging unit may judge the traveling condition of the vehicle based on the vehicle condition detected by the vehicle condition detecting unit. According to the unique arrangement of this preferred embodiment described above, the traveling condition of the vehicle can be determined accurately based on the vehicle condition detection result.

Preferably, the vehicle condition detecting unit includes at least one of an accelerator sensor arranged to detect the operational state of the accelerator, a speed sensor arranged to detect the vehicle speed, an acceleration sensor arranged to detect the vehicle acceleration, and a seat sensor arranged to detect that a crew (particularly, the driver) has taken his/her seat in the vehicle, for example.

When the vehicle image display apparatus further includes a vehicle condition detecting unit that is arranged to repeatedly detect the vehicle condition at certain time intervals, the operating unit may generate, based on the previous vehicle condition and the current vehicle condition currently detected by the vehicle condition detecting unit, a parameter for abstractly representing the vehicle condition. In this case, the display unit preferably displays, based on the traveling condition representing parameter and the vehicle condition representing parameter which have been generated by the operating unit, an image which abstractly represents both the vehicle condition and traveling condition of the vehicle.

According to the unique arrangement of the preferred embodiment described above, there can be obtained a parameter which reflects the past records not only of the traveling condition of the vehicle, but also of the vehicle condition. It is therefore possible to represent an image closer to what an actual living matter (e.g., an animal such as a human) is feeling.

The previous vehicle condition is expressed by the parameter value prior to the judgment of the current vehicle condition. Accordingly, the operating unit may generate, based on the previous parameter and the judgment result of the current vehicle condition, a parameter representing the current traveling condition of the vehicle.

The vehicle condition representing parameter may include a comfort/anxiety parameter representing a comfort/anxiety condition. In this case, the vehicle image display apparatus preferably further includes a comfort/anxiety parameter change amount setting unit that is arranged to set a comfort/anxiety parameter change amount (increasing/decreasing value) corresponding to the vehicle condition detected by the vehicle condition detecting unit. Preferably, the operating unit acquires, from the comfort/anxiety parameter change amount setting unit, a comfort/anxiety parameter change amount corresponding to the current vehicle condition detected by the vehicle condition detecting unit, and then generates the comfort/anxiety parameter change amount thus acquired and the previous comfort/anxiety parameter, thereby generating a comfort/anxiety parameter representing the current vehicle condition. Preferably, the display unit displays a vehicle comfort/anxiety condition representing image based on the comfort/anxiety parameter generated by the operating unit.

According to the unique arrangement of the preferred embodiment described above, the vehicle condition can be represented in the form of an image based on the comfort/anxiety parameter. Accordingly, the vehicle user can have a biological image for the vehicle and can therefore be deeply attached thereto.

Preferably, the vehicle condition detecting unit includes at least one of a touch sensor arranged to detect a contact with a vehicle preferably at a predetermined portion thereof, a traveling record detecting unit arranged to detect the traveling record of the vehicle, a luminous intensity sensor arranged to detect the brightness around the vehicle, a fuel FULL detecting unit arranged to detect that the vehicle fuel tank is full of fuel, a fuel SHORT detecting unit arranged to detect that the fuel residual quantity in the vehicle fuel tank is less than a predetermined amount, and a fall detecting unit arranged to detect that the vehicle has fallen down, for example.

Particularly, the fall detecting unit may be adopted for a saddle-type vehicle. This fall detecting unit may be for example an acceleration sensor arranged to detect the vehicle acceleration.

A vehicle image display apparatus according to another preferred embodiment of the present invention includes a vehicle condition detecting unit that is arranged to repeatedly detect the vehicle condition at certain time intervals, an operating unit that is arranged to generate, based on the previous vehicle condition and the current vehicle condition currently detected by the vehicle condition detecting unit, a parameter for abstractly representing the vehicle condition, and a display unit that is arranged to display, based on the parameter generated by the operating unit, an image which abstractly represents the vehicle condition.

According to the unique arrangement of this preferred embodiment, a parameter which reflects the record of the past vehicle condition is generated, and therefore an image represented with the use of this parameter is very close to what living matter (particularly, a human being) is feeling. As a result, the vehicle user has a strong affinity toward the vehicle.

A vehicle of a preferred embodiment of the present invention preferably includes a traveling wheel, a drive source arranged to transmit a drive force to the traveling wheel, and a vehicle image display apparatus having characteristics similar to those of the various preferred embodiments of the present invention mentioned above. According to the unique arrangement of this preferred embodiment, the vehicle condition or traveling condition of the vehicle is represented in the form of an image (e.g., anthropomorphic representation) that is very close to the feeling of living matter (particularly, a human being). Thus, the user can easily have a strong affinity toward the vehicle.

Preferably, the drive source includes an electromotor. More specifically, when the vehicle is a so-called electrically-powered vehicle, the vehicle tends to be less powerful as compared with an engine vehicle of which traveling wheel is driven by an engine. In such a case, by abstractly (e.g., biologically, and preferably, anthropomorphically) representing the vehicle condition and traveling condition of the vehicle, the user can recognize in a fully sensory manner the vehicle condition and traveling condition of the vehicle, thus encouraging the user to properly drive and handle the vehicle according to such conditions.

Preferably, the vehicle further includes a battery arranged to supply electric power to the electromotor, a generator connected to the battery and arranged to charge the same with electricity, and an engine (internal-combustion engine) for driving the generator. In such a case, the vehicle is a so-called hybrid vehicle. This vehicle may be a series-type hybrid vehicle in which a drive force is supplied to the traveling wheel solely from the electromotor, or may be a parallel-type hybrid vehicle in which not only a drive force from the electromotor, but also a drive force from the engine can be transmitted to the traveling wheel.

In particular, a series-type hybrid vehicle tends to be less powerful. Accordingly, it is very effective that the abstract representations (particularly, biological representations) of the vehicle condition and traveling condition of the vehicle, urge the driver to properly drive and handle the vehicle according to these conditions.

The foregoing and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a view illustrating an example of a comfort/anxiety parameter table;

FIG. 6 is a view illustrating an example of a hard/easy parameter table;

FIG. 16 is a flow chart illustrating an image display processing;

FIG. 17A to FIG. 17D are views illustrating examples of image display corresponding to the hard/easy condition;

FIG. 19A to FIG. 19C are views illustrating examples of image display corresponding to anxious/comfortable/normal conditions; and FIG. 20A and FIG. 20B are views illustrating examples of image display corresponding to a strong anxiety condition and a weak anxiety condition.

DETAILED DESCRIPTION OF THE PREFERRED EMBODIMENTS

Figure 1:
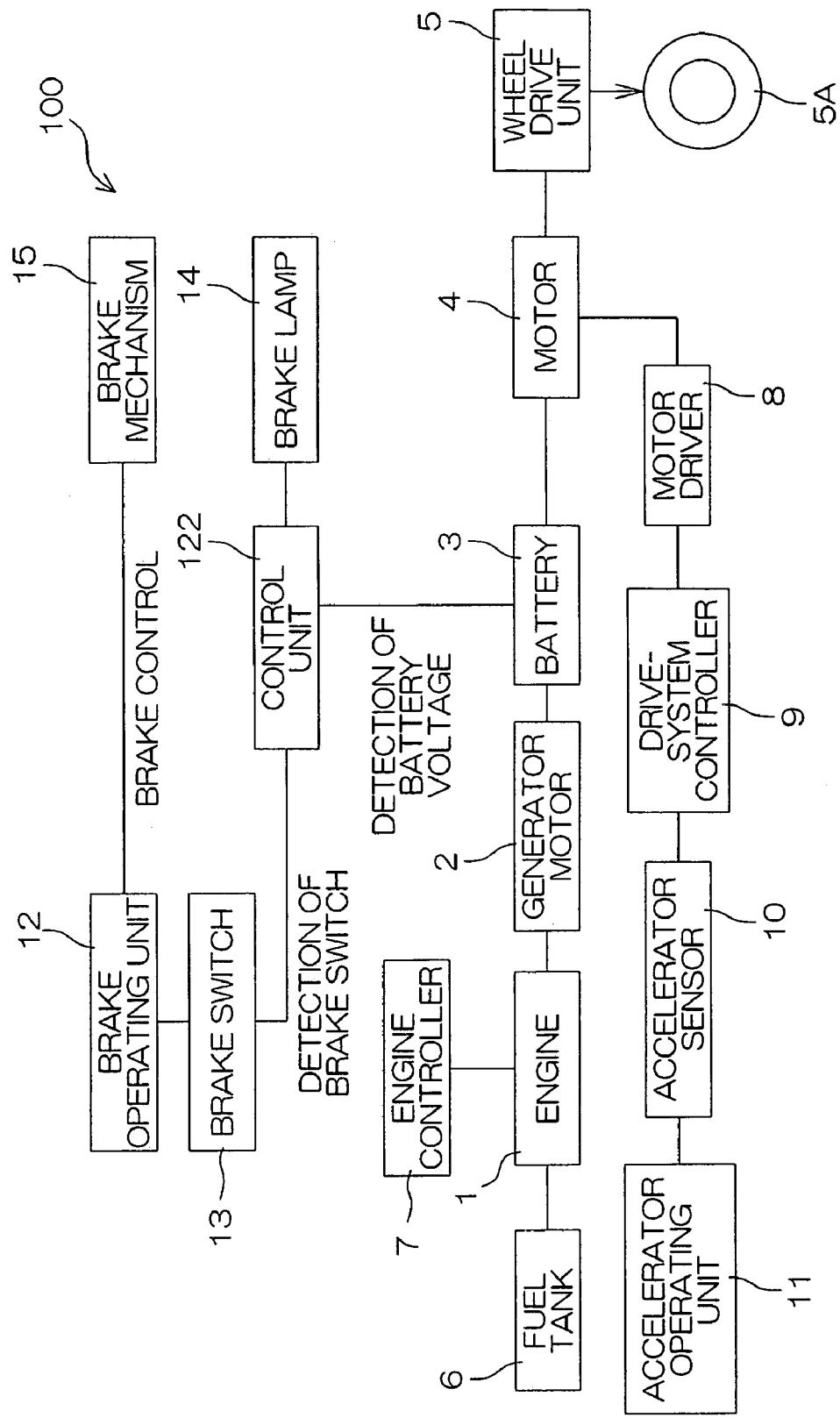
FIG. 1 is a block diagram illustrating the arrangement of a hybrid vehicle according to a preferred embodiment of the present invention.

FIG. 1 is a schematic diagram for illustrating the arrangement of a hybrid vehicle 100 (for example, a two-wheeled vehicle in this preferred embodiment) according to a preferred embodiment of the present invention. This hybrid vehicle 100 is preferably a series-type hybrid vehicle in which a generator motor 2, driven by an engine 1, charges a battery 3 with electricity and the battery 3 drives a drive motor 4, thus enabling the hybrid vehicle 100 to travel. By transmitting the torque of the drive motor 4 to a wheel drive unit 5, the traveling wheel 5A is rotated such that the hybrid vehicle 100 travels.

Upon reception of the supply of a fuel from a fuel tank 6, the engine 1 is driven as controlled by an engine controller 7. The engine controller 7 controls the engine 1 at a constant rotational speed to realize good fuel consumption.

A motor driver 8 controls the supply of electricity from the battery 3 to the drive motor 4. The motor driver 8 is operated based on a control signal from a drive-system controller 9. The drive-system controller 9 generates a control signal according to an output signal from an accelerator sensor 10. The accelerator sensor 10 is arranged to detect the operation amount of an accelerator operating unit 11 of the hybrid vehicle 100. Typical examples of the accelerator operating unit 11, include an accelerator grip (normally the right grip) rotatably attached to the handle shaft in a two-wheeled vehicle, and an accelerator pedal in a four-wheeled vehicle.

The voltage of the battery 3 is arranged to be detected by a control unit 122. The control unit 122 controls the ON/OFF state of a brake lamp 14 upon reception of a brake switch detecting signal supplied from a brake switch 13 which detects the operation of a brake operating unit 12. Further, a brake control is conducted on a brake mechanism 15 by the operation of the brake operating unit 12. The brake operating unit 12 may be a brake lever or a brake pedal.

Figure 2:
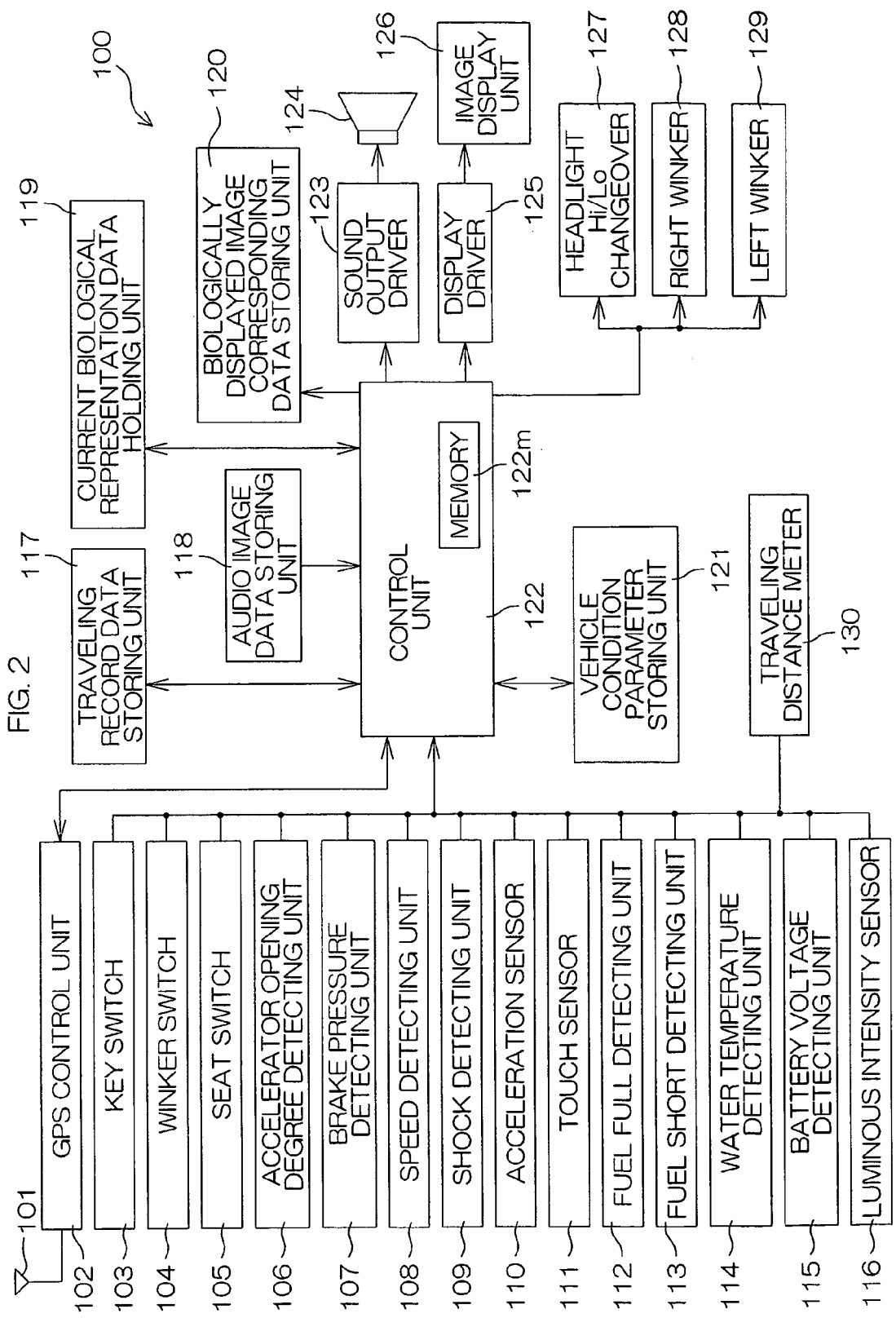
FIG. 2 is a block diagram illustrating in more detail the arrangement of a control system of the hybrid vehicle.

FIG. 2 is a block diagram illustrating in more detail the arrangement of the control system of the hybrid vehicle 100. An antenna 101 is a GPS (Global Positioning System) antenna arranged to receive and supply a GPS signal to a GPS control unit 102. By a command from the control unit 122, the GPS control unit 102 starts receiving the GPS signal from the antenna 101. The GPS control unit 102 demodulates the GPS signal entered from the antenna 101 and supplies, at regular intervals, positional information indicating the current traveling position to the control unit 122. A key switch 103 is arranged to start the hybrid vehicle 100 and to supply its ON/OFF signal to the control unit 122.

A blinker switch 104 is arranged to turn ON/OFF the blinkers and supplies its ON/OFF signal to the control unit 122. A seat switch 105 is arranged to detect that the user has taken his/her seat, and to supply, to the control unit 122, a seat ON/OFF signal indicating whether or not the driver has taken his/her seat. An accelerator opening degree detecting unit 106 is arranged to detect the accelerator opening degree (operation amount) and to supply an accelerator opening degree detecting signal to the control unit 122. A brake pressure detecting unit 107 is arranged to detect the brake pressure and to supply a brake pressure detecting signal to the control unit 122.

A speed detecting unit 108 is arranged to detect the traveling speed of the hybrid vehicle 100 and to supply a speed detecting signal to the control unit 122. A shock detecting unit 109 is arranged to detect that a shock has been exerted to the hybrid vehicle 100, and to supply a shock detecting signal to thecontrolunit122. An acceleration sensor 110 is preferably a three-axis or three-dimensional acceleration sensor arranged to detect the acceleration generated, for example, when the hybrid vehicle 100 has fallen down, and to supply an acceleration detecting signal to the control unit 122. A touch sensor 111 is attached to a position of the hybrid vehicle 100 that the user touches (for example, on the vehicle body surface). The touch sensor 111 is arranged to detect that the vehicle has been touched by the user, and to supply a touch detecting signal to the control unit 122.

A fuel FULL detecting unit 112 is arranged to detect whether or not the fuel tank is filled with fuel, and to supply a fuel FULL detecting signal to the control unit 122. A fuel SHORT detecting unit 113 is arranged to detect whether or not the fuel amount in the fuel tank is low (less than a predetermined amount), and to supply a fuel SHORT detecting signal to the control unit 122. A water temperature detecting unit 114 is arranged to detect the temperature of a cooling water used for cooling the engine, and to supply a water temperature detecting signal to the control unit 122. A battery voltage detecting unit 115 is arranged to detect a battery output voltage and to supply a battery voltage detecting signal to the control unit 122. A luminous intensity sensor 116 is arranged to detect the luminous intensity around the hybrid vehicle 100 and to supply a luminous intensity detecting signal to the control unit 122. A CCD (Charge Coupled Devices) camera may be used as the luminous intensity sensor 116.

A traveling record data storing unit 117 is arranged to store traveling position data regularly entered from the control unit 122 while the hybrid vehicle 100 is traveling. An audio image data storing unit 118 stores, as corresponding to image data numbers, audio image data to be displayed and reproduced in an image display processing, to be discussed later, based on both the traveling condition and the vehicle condition of the hybrid vehicle 100. A current biological representation data holding unit 119 is arranged to store biological representation coordinates corresponding to the current vehicle condition and the current traveling condition respectively judged in a vehicle condition judging processing and a traveling condition judging processing, both to be discussed later. A traveling distance meter 130 is arranged to integrate and store the distance that the hybrid vehicle 100 has traveled.

A biologically displayed image corresponding data storing unit 120 is arranged to store both the biological representation coordinates and the image data numbers of the audio image data which biologically (preferably, anthropomorphically) represent the vehicle condition and the traveling condition for each of the biological representation coordinates, the biological representation coordinates and the image data numbers being arranged as corresponding to each other. For example, as shown by a schematic diagram in FIG. 3, there is supposed, as the vehicle's biological representation coordinates, a biological representation coordinate plane formed by two axes, a hard/easy axis and a comfort/anxiety axis. The coordinate axes forming the biological representation coordinate plane are not limited to the hard/easy axis and the comfort/anxiety axis, and there maybe set coordinate axes representing parameters corresponding to other biological representations (particularly, anthropomorphic representations). Further, there may be supposed a biological representation space having three or more axes on the assumption that three or more biological representations are used.

Figure 3:
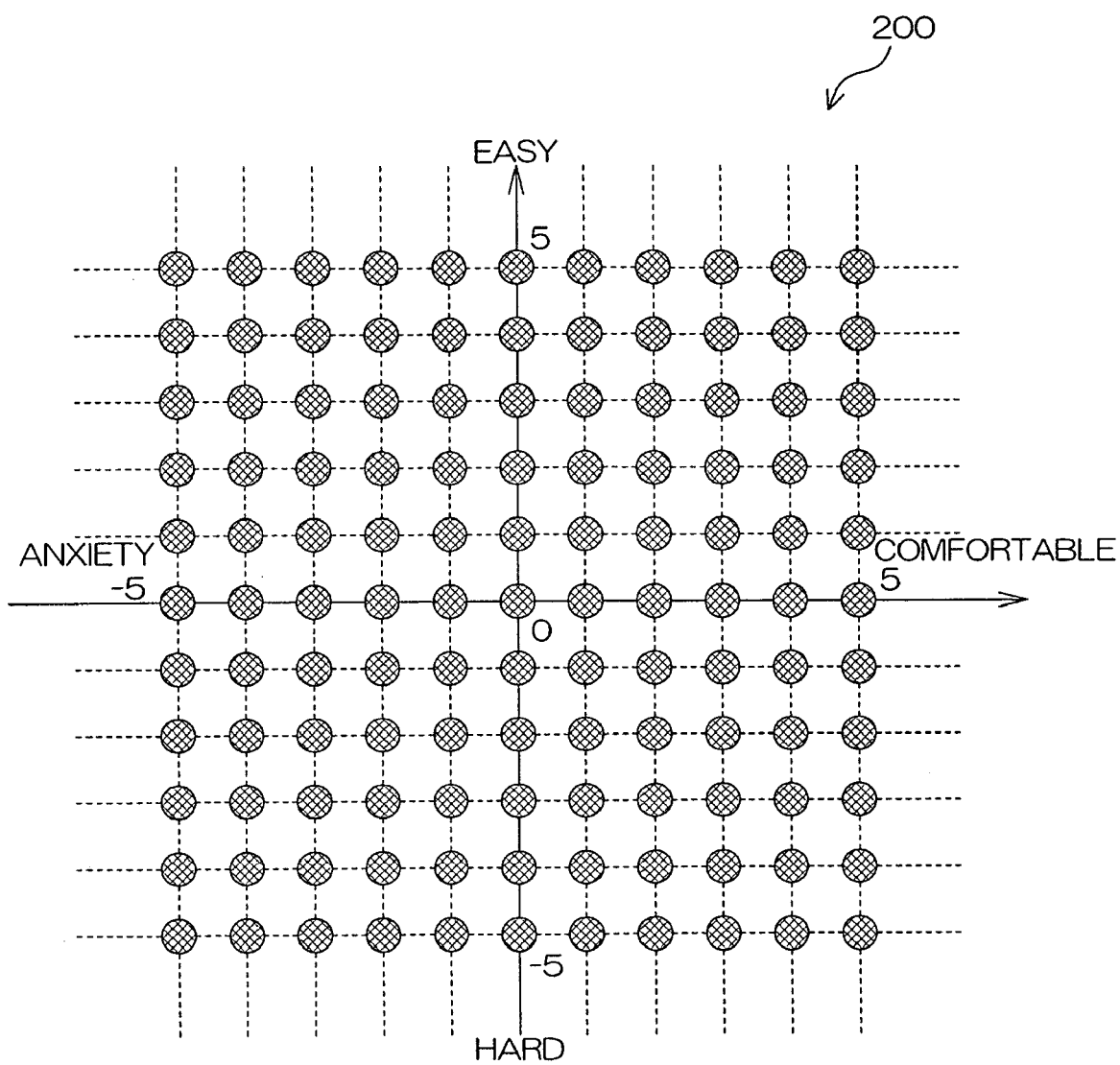
FIG. 3 is a view illustrating an example of a biological representation coordinate plane (feeling coordinate plane) having a hard/easy axis and a comfort/anxiety axis.
Figure 4:
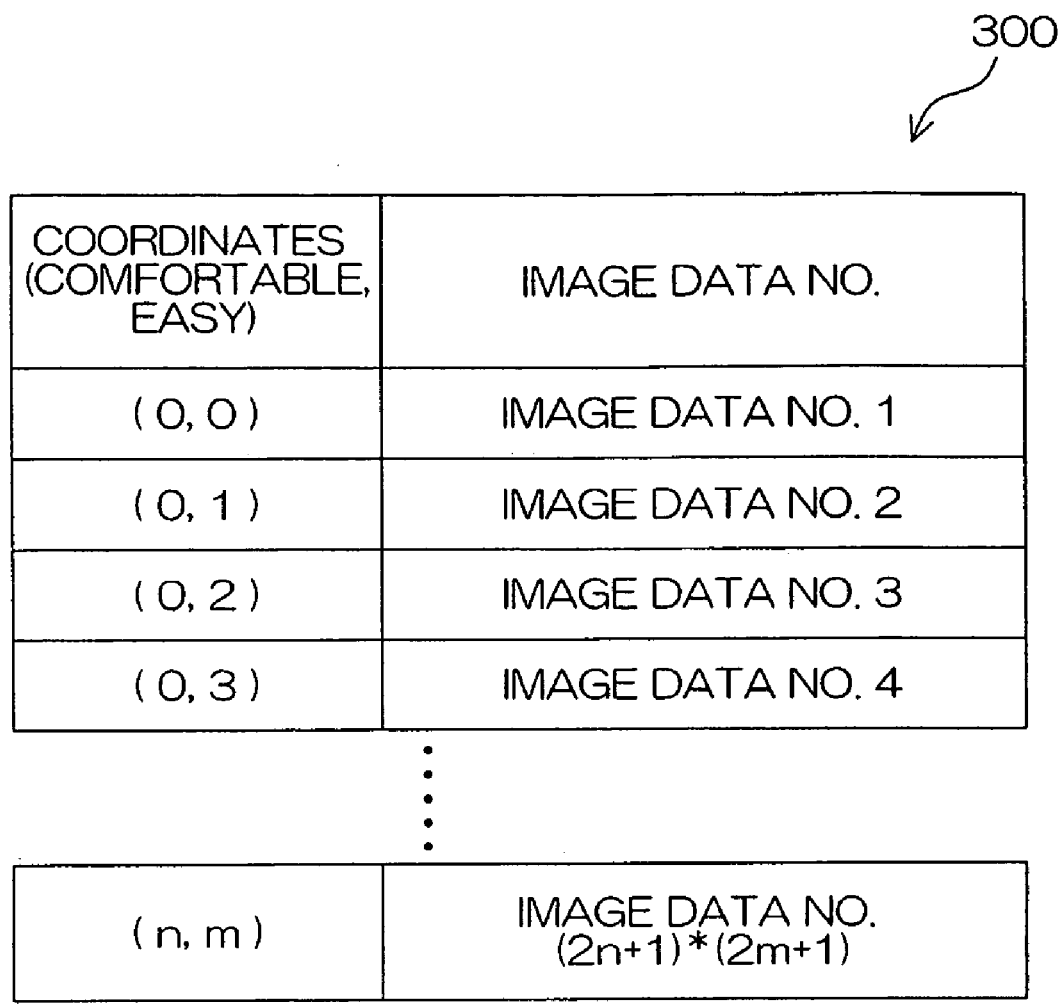
FIG. 4 is a view illustrating an example of a biological representation coordinates-display image table.

The biologically displayed image corresponding data storing unit 120 stores, based on the biological representation coordinate plane shown in FIG. 3, a biological representation coordinates-display image table 300 as shown in FIG. 4. In the biological representation coordinates-display image table 300, the coordinates [e.g., comfortable, easy] are set as the biological representation coordinates, and the image data numbers are set as corresponding to the respective coordinates.

A vehicle condition parameter storing unit 121 preferably stores at least the following: a table in which there are set increasing/decreasing values of biological representation parameters corresponding to the conditions (vehicle conditions) detected by the GPS control unit 102, the detecting units 106–109 and 112–115, the switches 103–105, and the sensors 110, 111, 116; and a table in which there are set increasing/decreasing values of biological representation parameters corresponding to the traveling conditions judged in the traveling condition judging processing to be discussed later. Examples of these tables are shown in FIG. 5 and FIG. 6.

FIG. 5 is a view illustrating an example of a comfort/anxiety parameter table 400 representing comfort/anxiety feelings as the biological representation parameter, and FIG. 6 is a view illustrating an example of a hard/easy parameter table 500 representing hard/easy feelings as the biological representation parameter. In the comfort/anxiety parameter table 400. or comfort/anxiety parameter change amount setting unit, there are set, for example, 8 patterns as vehicle conditions corresponding to the comfort/anxiety feelings, and there are also set, as corresponding to the vehicle conditions, change amounts (adding/subtracting values) of the parameter which relatively moves on lattice points of the biological representation coordinates in FIG. 3.

The vehicle conditions corresponding to the comfort/anxiety feelings are detected by the GPS control unit 102, the touch sensor 111, the fuel FULL detecting unit 112, the fuel SHORT detecting unit 113 and the luminous intensity sensor 116. For example, when the touch sensor 111 supplies a touch detecting signal and it is judged that the vehicle has been stroked or rubbed, [+2] is applied as the comfort/anxiety parameter change amount (adding/subtracting value).

Figure 7:
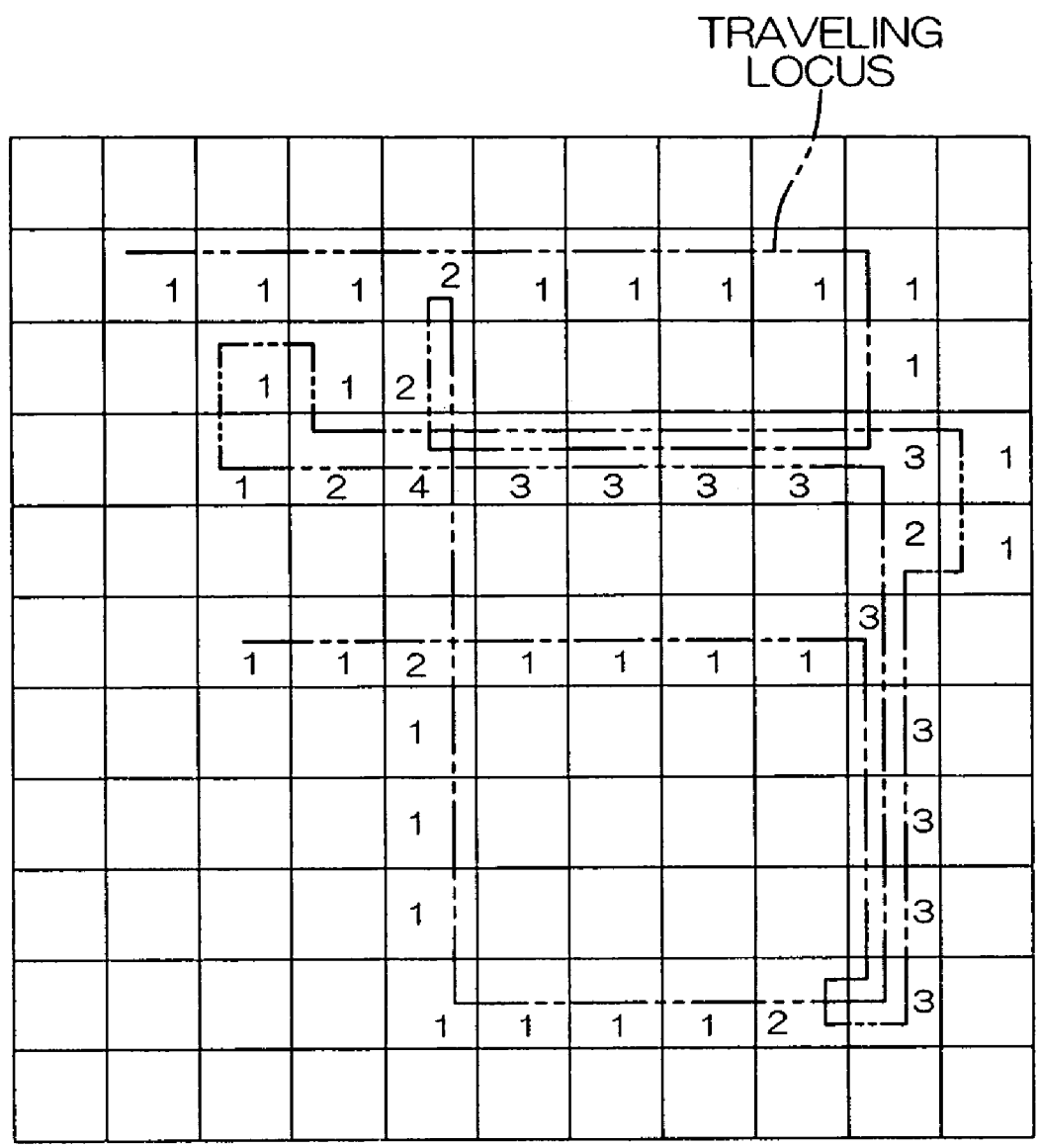
FIG. 7 is a view illustrating a judgment on a traveling area.

Whether or not the area is an often traveled area, is judged based on the traveling position data stored in the traveling record data storing unit 117. More specifically, the vehicle position detected by the GPS control unit 102 is regularly written in the traveling record data storing unit 117 by the operation of the control unit 122. For example, as shown in FIG. 7, a coordinate plane imaginarily set on the ground is divided by a plurality of squares having predetermined sizes. The traveling record data storing unit 117 holds pieces of information each representing the number of times (number of passing times) which the hybrid vehicle 100 has passed through each square.

The control unit 122 supplies, for example, points or marks to each square (zero point incipiently). Specifically, when the vehicle passes through a certain square, the control unit 122 adds 10 points to the square. When the engine 1 is turned off, the control unit 122 subtracts 1 point from each square having 1 point or more.

When the number of points of the square corresponding to the current position of the hybrid vehicle 100 detected by the GPS control unit 102 is not less than a predetermined threshold (e.g., 50 points), the control unit 122 judges that the hybrid vehicle 100 is now traveling in an often traveled area. Otherwise, the control unit 122 judges that the hybrid vehicle 100 is not traveling in an often traveled area.

When it is judged that the hybrid vehicle 100 is now traveling in the often traveled area, [+1] is applied as the comfort/anxiety parameter change amount (adding/subtracting value). On the contrary, when the current position of the hybrid vehicle 100 is in the square for which the number of passing times is zero, it is judged that this is an area in which the hybrid vehicle 100 has never traveled. The comfort/anxiety parameter change amount (adding/subtracting value) for this judgment is set to [−1].

Whether or not the surrounding area is bright is judged by comparing the luminous intensity detected by the luminous intensity sensor 116 with a predetermined threshold. When the surrounding area is judged to be bright, the comfort/anxiety parameter change amount is set to [+1]. On the contrary, when the surrounding area is judged to be dark, the comfort/anxiety parameter change amount is set to [−1].

Whether or not the gasoline tank is full is judged based on the output from the fuel FULL detecting unit 112. Whether or not the gasoline residual quantity is low, is judged based on the output from the fuel SHORT detecting unit 113. When the gasoline tank is full, the comfort/anxiety parameter change amount is set to [+1]. When the gasoline residual quantity is judged to be low a certain level, the comfortable/anxiety parameter change amount is set to [−1].

The judgment that the hybrid vehicle 100 has fallen is made based on the output from the acceleration sensor 110. When the hybrid vehicle 100 has fallen, the comfort/anxiety parameter change amount is set to [−2].

As discussed in the foregoing, the hybrid vehicle 100 is compared to a living thing (e.g., an animal such as a human being or the like), and the comfort/anxiety parameter change amount is set to a positive value for the condition (vehicle condition) in which the living thing can have a sense of security, and the comfort/anxiety parameter change amount is set to a negative value for the condition in which the living thing has a sense of anxiety. More specifically, the comfort/anxiety parameter expresses that the degree of security is higher as its value is greater and the sense of anxiety is higher as its value is smaller.

In the hard/easy parameter table 500. or hard/easy parameter change amount setting unit, 6 patterns, for example, are preferably set as the traveling conditions corresponding to the hard/easy feelings, and there are also set, as corresponding to the traveling conditions, change amounts (adding/subtracting values) of the parameter which relatively moves on lattice points of the biological representation coordinates (feeling representation coordinates). The traveling conditions corresponding to the hard/easy feelings are judged in the traveling condition judging processing to be discussed later. For example, when it is judged as the traveling condition that the vehicle 100 is descending a steep downward slope, [+2] is applied as the hard/easy parameter change amount (adding/subtracting value). When the traveling condition is a pushing and walking condition, the hard/easy parameter change amount is set to [+1]. When the traveling condition is a gentle downward slope descending condition, the hard/easy parameter change amount is set to [+1]. When the traveling condition is a gentle upward slope ascending condition, the hard/easy parameter change amount is set to [−1]. When the traveling condition is a steep upward slope ascending condition, the hard/easy parameter change amount is set to [−2]. The detail of the traveling condition judging processing will be discussed later. Further, when the traveling condition is a legal maximum speed condition, the hard/easy parameter change amount is set to [−2]. Whether or not the vehicle 100 is traveling at a legal maximum speed is judged based on the output signal from the speed detecting unit 108.

As discussed in the foregoing, the vehicle 100 is compared to a living thing (e.g., an animal such as a human being or the like), and the hard/easy parameter change amount is set to a negative value for the condition (traveling condition) in which the living thing needs much energy, and the hard/easy parameter change amount is set to a positive value for the condition (traveling condition) in which the living thing does not require much energy. More specifically, the hard/easy parameter expresses that the condition is easier as its value increases and the condition is harder as its value decreases.

Tables in FIG. 5 and FIG. 6 show contents set for portions of vehicle conditions corresponding to comfort/anxiety feelings and for portions of traveling conditions corresponding to hard/easy feelings. It is a matter of course that similar settings can be made for other vehicle conditions and other traveling conditions.

The control unit 122 preferably includes a CPU (Central Processing Unit), a memory 122m (See FIG. 2) and other suitable elements. The control unit 122 judges both the vehicle condition and the traveling condition of the hybrid vehicle 100 based on the detecting signals entered from the GPS control unit 102, the detecting units 106–109 and 112–115, the switches 103–105, and the sensors 110, 111, 116. The control unit 122 executes a process such that an image display unit 126 displays an image corresponding to the hard/easy or comfort/anxiety condition of the hybrid vehicle 100, and such that a speaker 124 generates a sound corresponding to the condition described above.

Further, the control unit 122 generates a headlight changeover signal, a right-blinker signal and a left-blinker signal based on the detecting signals entered from the GPS control unit 102, the detecting units 106–109 and 112–115, the switches 103–105, and the sensors 110, 111, 116, to thereby control the operations of a headlight 127, a right blinker 128 and a left blinker 129.

A sound output driver 123 converts audio data entered from the control unit 122, into an audio signal and then supplies this audio signal to the speaker 124. The speaker 124 supplies, in the form of a sound, the audio signal entered from the sound output driver 123. A display driver 125 converts an image data entered from the control unit 122, into a display image signal, and supplies the display image signal to an image display unit 126. The image display unit 126 may be a liquid crystal display panel or other suitable display device and displays an image corresponding to the display image signal entered from the display driver 125. The image display unit 126 may also serve as a meter display panel for displaying the speed, the fuel residual quantity, and/or other suitable information.

The luminous intensity of the headlight 127 is switched between HIGH and LOW by the headlight changeover signal entered from the control unit 122. The right blinker 128 is blinked by a right blinker signal entered from the control unit 122. The left blinker 129 is blinked by a left blinker signal entered from the control unit 122.

Figure 8:
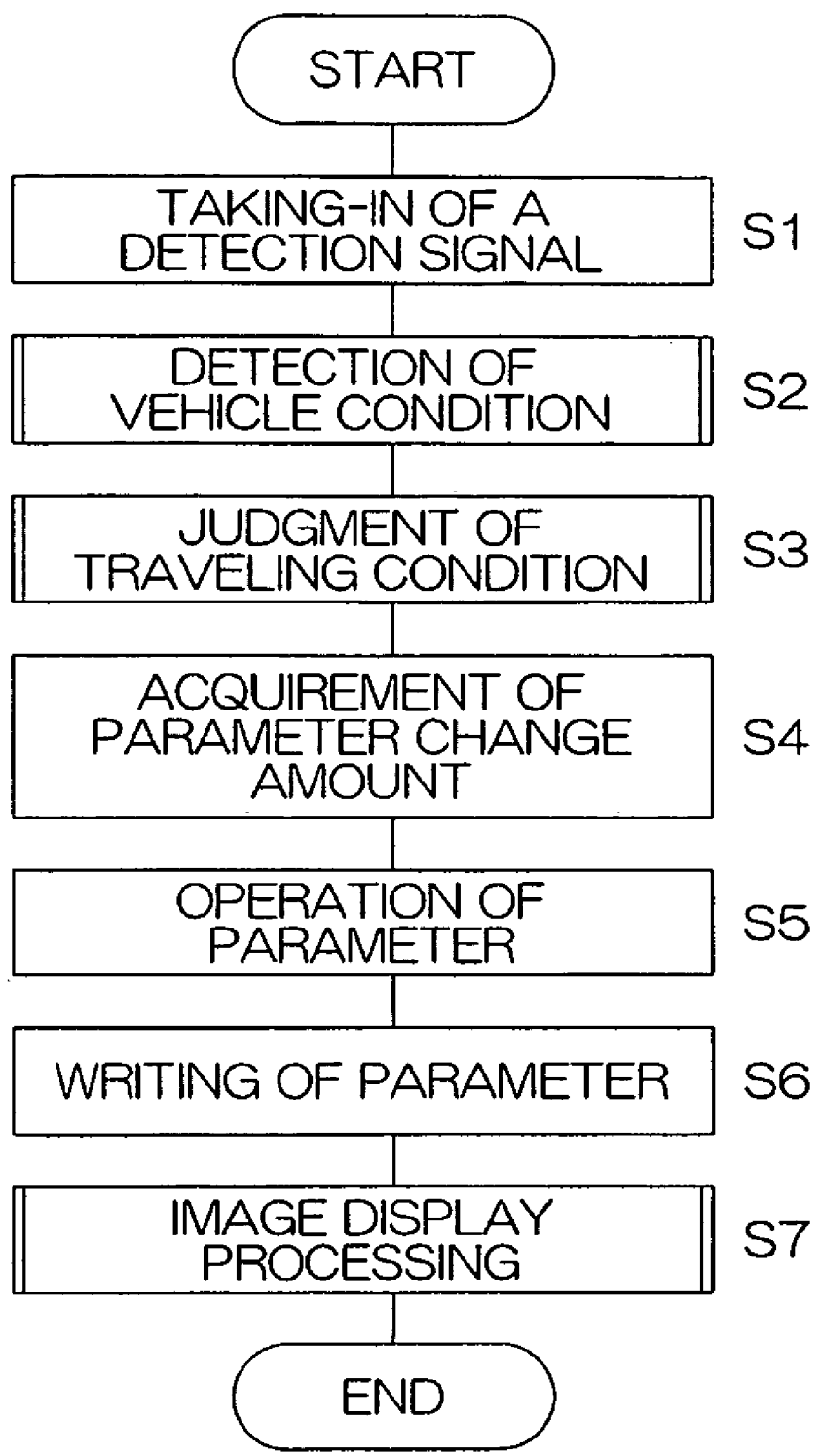
FIG. 8 is a flow chart illustrating the outline of processes of display and the like corresponding to comfort/anxiety and hard/easy conditions.

FIG. 8 is a flow chart illustrating the outline of the processing executed by the control unit 122 for display or the like corresponding to comfort/anxiety and hard/easy conditions. This processing is repeatedly executed by the control unit 122 at predetermined control cycles (e.g., approximately every 1 to 5 seconds).

The control unit 122 takes in the detecting signals entered from the GPS control unit 102, the detecting units 106–109 and 112–115, the switches 103–105, and the sensors 110, 111, 116 (Step S1). Based on these detecting signals, the control unit 122 executes a vehicle condition detecting processing (Step S2) for detecting the vehicle condition of the hybrid vehicle 100, and further executes a traveling condition judging processing (Step S3) for judging the traveling condition of the hybrid vehicle 100.

The control unit 122 obtains from the vehicle condition parameter storing unit 121 the biological representation parameter change amounts (adding/subtracting values) corresponding to the current traveling condition and vehicle condition detected or judged at the current control cycle (Step S4). Further, the control unit 122 adds the biological representation parameter change amounts thus obtained, to the previous biological representation coordinates (previous biological representation parameters; coordinate (0,0) incipiently) held by the current biological representation data holding unit 119 (Step S5). This addition operation determines the biological representation coordinates corresponding to the current vehicle condition and traveling condition (See FIG. 3). More specifically, the biological representation coordinates represent the comfort/anxiety and hard/easy conditions of the hybrid vehicle 100, and the biological representation coordinates are moved, according to the judgment results of the vehicle condition and traveling condition at each control cycle, as if walking from one lattice point to another lattice point on the biological representation coordinate plane. The control unit 122 writes, in the current biological representation data holding unit 119, the obtained biological representation coordinates (biological representation parameters) as a current control cycle value (Step S6). At this time, the control unit 122 keeps the biological representation coordinates at the previous control cycle in order to use the same to check whether or not the biological representation coordinates have been changed.

Thereafter, the control unit 122 executes, based on the current biological representation coordinate values, an image display processing for displaying a biological representation image on the image display unit 126 (Step S7).

The control unit 122 stores in the memory 122m the respective programs for the vehicle condition judging processing, the traveling condition judging processing and the image display processing.

Figure 9:
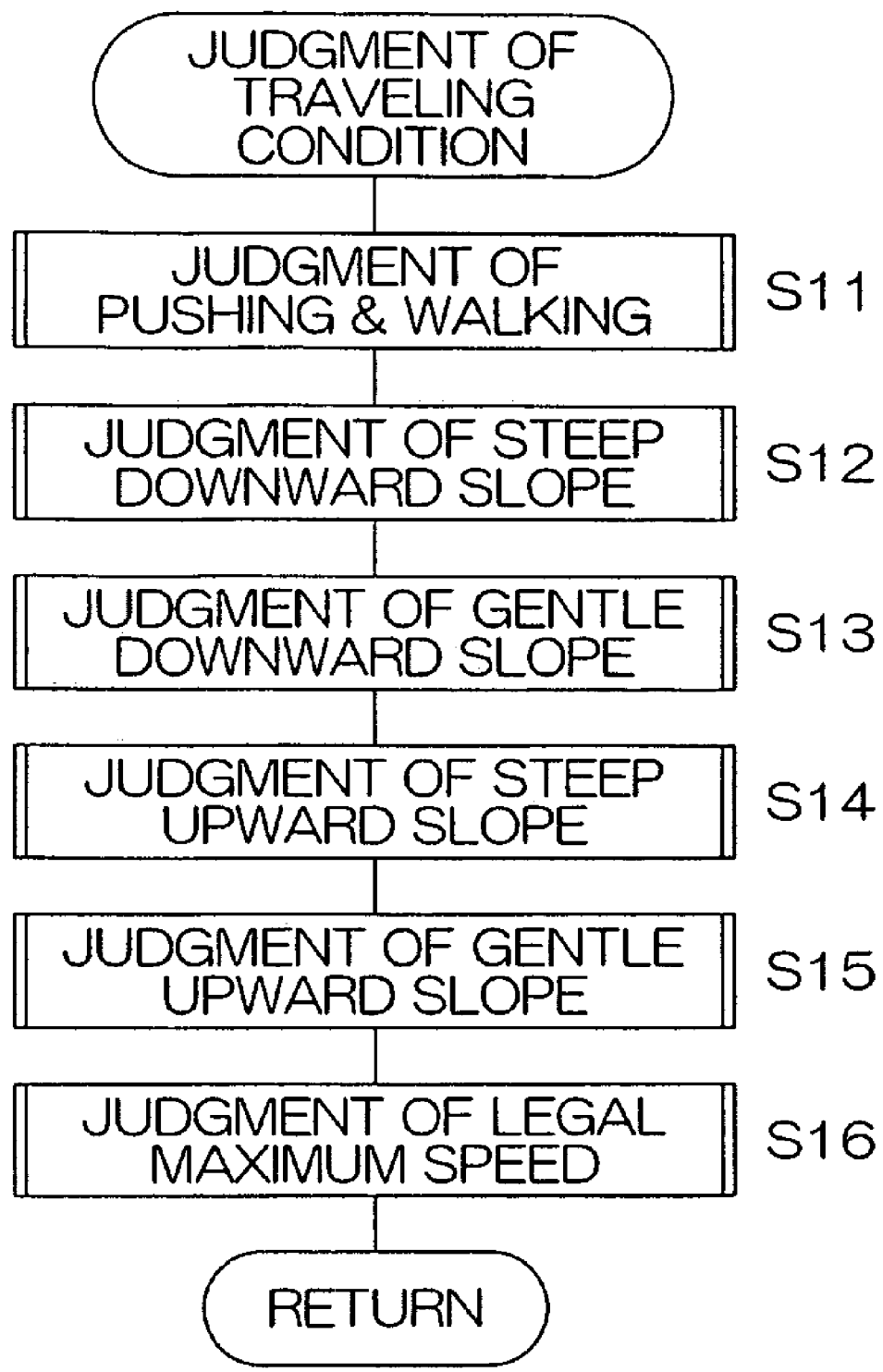
FIG. 9 is a flow chart illustrating the general flow of a traveling condition judging processing.

As shown in the flow chart in FIG. 9, the traveling condition judging processing (Step S3 in FIG. 8) includes a judging process for judging a pushing and walking condition (Step S11), a judging process for judging a steep downward slope descending condition (Step S12), a judging process for judging a gentle downward slope descending condition (Step S13), a judging process for judging a steep upward slope ascending condition (Step S14), a judging process for judging a gentle upward slope ascending condition (Step S15), and a judging process for judging a legal maximum speed condition (Step S16). It is noted that these judgment processes do not always have to be executed in the order shown in FIG. 9, and that two or more processes may be executed in parallel.

Figure 10:
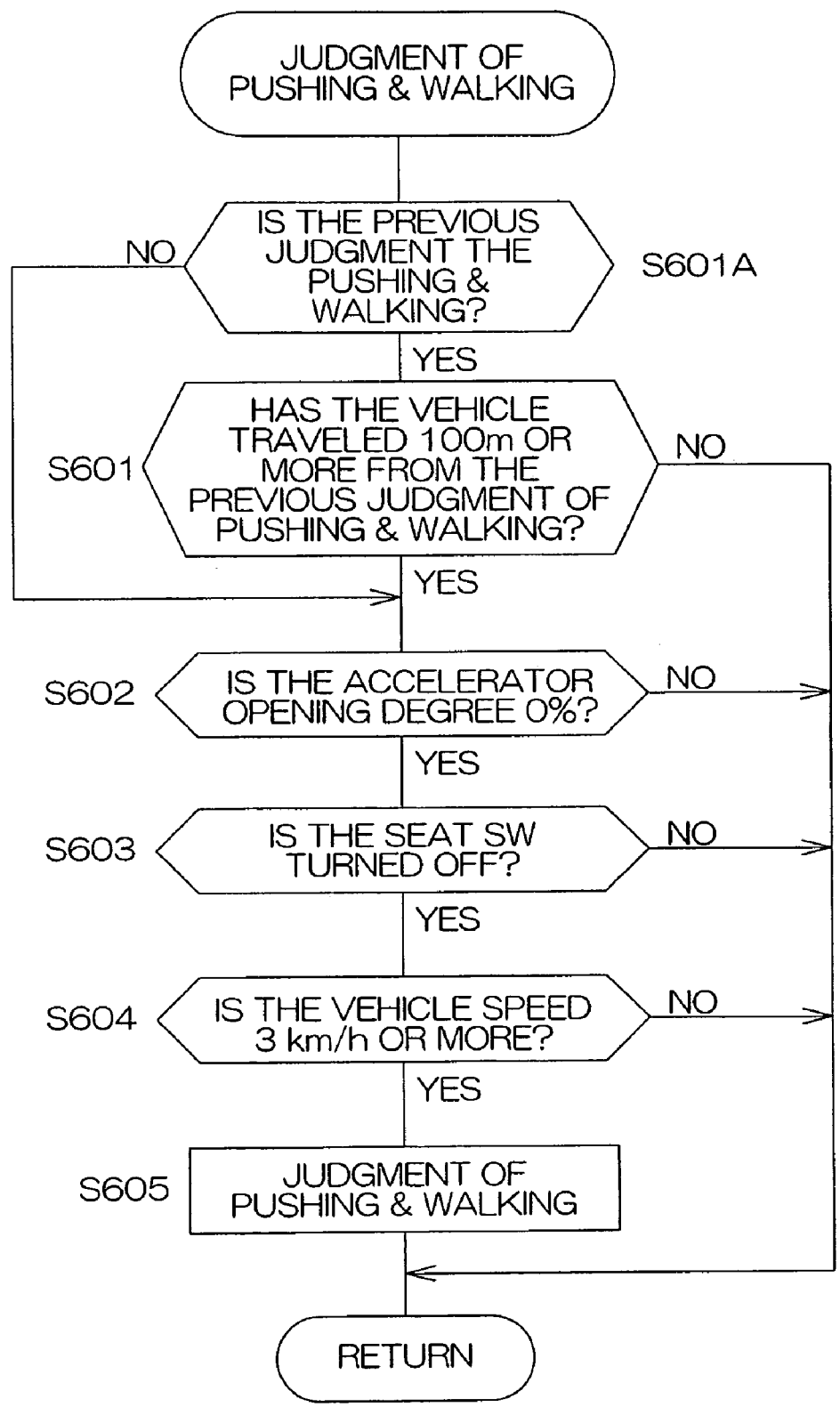
FIG. 10 is a flow chart illustrating a pushing and walking condition judging processing.

FIG. 10 is a flow chart for illustrating the pushing and walking condition judging processing (Step S11 in FIG. 9). The control unit 122 judges whether or not the result of the traveling condition judging processing at the previous control cycle was the pushing and walking condition (Step S601A). When it has been judged that the previous traveling condition was the pushing and walking condition, the control unit 122 judges, by referring to the traveling distance meter 130, whether or not the vehicle 100 has traveled 100 meters or more, for example, from that judgment time (Step S601).

When it has been judged that the previous traveling condition was not the pushing and walking condition (NO at Step S601A), the control unit 122 executes the pushing and walking condition judging processing even though the vehicle 100 has not traveled 100 meters or more. When it has been judged that the previous traveling condition was the pushing and walking condition (YES at Step S601A), but the traveling distance from that judgment has not reached 100 meters (NO at Step S601), the processing by the control unit 122 is returned with no subsequent processes for pushing and walking condition judgment being executed.

The value of 100 meters serving as the traveling condition judgment basis is merely by way of example and other distances and other parameters, for example a period of time of 1 second or the like, may be used. The processing at Step S601 is executed in order to provide a predetermined interval such that the biological representation coordinate values are not moved for a short period of time on the biological representation coordinates.

The processing by the control unit 122 proceeds to Step S602 when it has been judged that the vehicle 100 has traveled 100 meters or more from the previously judged traveling condition or the pushing and walking condition (YES at Step S601). At Step S602, the control unit 122 judges, based on the accelerator opening degree detecting signal entered from the accelerator opening degree detecting unit 106, whether or not the accelerator opening degree is 0%. When the control unit 122 has judged that the accelerator opening degree is not 0%, the processing by the control unit 122 is returned with no subsequent processes being executed. When the control unit 122 has judged that the accelerator opening degree is 0%, the processing by the control unit 122 proceeds to Step S603.

At Step S603, the control unit 122 judges, based on the seat ON/OFF signal entered from the seat switch 105, whether or not the seat switch 105 is turned OFF. When the control unit 122 has judged that the seat switch 105 is turned ON, the processing by the control unit 122 is returned with no subsequent processes being executed. When the control unit 122 has judged that the seat switch 105 is turned OFF, the processing by the control unit 122 proceeds to Step S604.

At Step S604, the control unit 122 judges, based on the speed detecting signal entered from the speed detecting unit 108, whether or not the vehicle speed is, for example, 3 km/h (kilometers per hour) or more. When the control unit 122 has judged that the vehicle speed is less than 3 km/h, the processing by the control unit 122 is returned with no subsequent processes being executed. When the control unit 122 has judged that the vehicle speed is 3 km/h or more, the processing by the control unit 122 proceeds to Step S605.

At Step S605, based on the fact that all the conditions judged at Step S602 to Step S604 have been satisfied, the control unit 122 judges that the current traveling condition is the pushing and walking condition, and the processing by the control unit 122 is returned. At this time, the control unit 122 acquires, from the vehicle condition parameter storing unit 121, the hard/easy parameter change amount (adding/subtracting value) corresponding to the pushing and walking condition (Step S4 in FIG. 8), and then carries out an operation with the use of the current biological representation coordinates of the current biological representation data holding unit 119 and the hard/easy parameter change amount (adding/subtracting value)(Step S5). At this time, [+1] which is the hard/easy parameter change amount (adding/subtracting value) corresponding to the pushing and walking condition, is acquired from the hard/easy parameter table 500 shown in FIG. 6, and is then added to the current biological representation coordinates.

Figure 11:
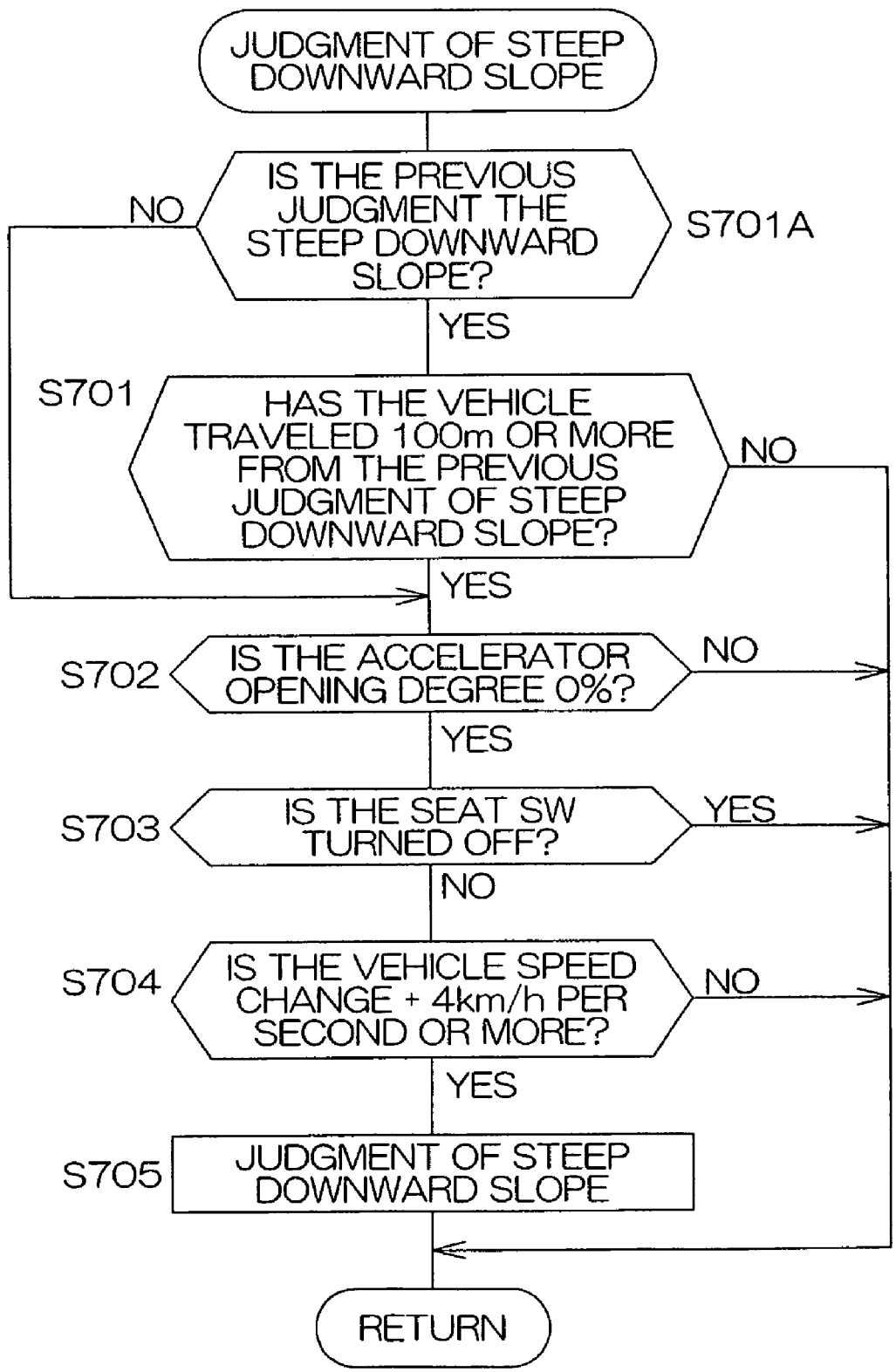
FIG. 11 is a flowchart illustrating a steep downward slope traveling condition judging processing.

FIG. 11 is a flow chart for illustrating the processing of judging the steep downward slope descending condition (Step S12 in FIG. 9). First, the control unit 122 judges whether or not the result of the traveling condition judging processing at the previous control cycle was the steep downward slope descending condition (Step S701A). When it has been judged that the previous traveling condition was the steep downward slope descending condition, the control unit 122 judges, by referring to the traveling distance meter 130, whether or not the vehicle 100 has traveled 100 meters or more from that judgment time (Step S701). When it has been judged that the previous traveling condition was not the steep downward slope descending condition (NO at Step S701A), the control unit 122 executes a process for judging whether or not the vehicle 100 is in the steep downward slope descending condition even though the vehicle 100 has not traveled 100 meters or more. When the previous traveling condition was the steep downward slope descending condition (YES at Step S701A) but the traveling distance from that judgment has not reached 100 meters (NO at Step S701), the processing by the control unit 122 is returned with no subsequent processes being executed. The object of Step S701 is similar to that of Step S601.

When the control unit 122 has judged that the vehicle 100 has traveled 100 meters or more from the previously judged traveling condition or the steep downward slope descending condition (YES at Step S701), the processing by the control unit 122 proceeds to Step S702. At Step S702, the control unit 122 judges, based on the accelerator opening degree detecting signal entered from the accelerator opening degree detecting unit 106, whether or not the accelerator opening degree is 0%. When the 1 control unit 122 has judged that the accelerator opening degree is not 0%, the processing by the control unit 122 is returned with no subsequent processes being executed. When the control unit 122 has judged that the accelerator opening degree is 0%, the processing by the control unit 122 proceeds to Step S703.

At Step S703, the control unit 122 judges, based on the seat ON/OFF signal entered from the seat switch 105, whether or not the seat switch 105 is turned ON. When the control unit 122 has judged that the seat switch 105 is turned OFF, the processing by the control unit 122 is returned with no subsequent processes being executed. When the control unit 122 has judged that the seat switch 105 is turned ON, the processing by the control unit 122 proceeds to the processing at Step S704.

At Step S704, the control unit 122 judges, based on the speed detecting signal entered from the speed detecting unit 108, whether or not the vehicle speed change (i.e., acceleration) is +4 km/h per second or more, for example. When the control unit 122 has judged that the vehicle speed change is not +4 km/h per second or more, the processing by the control unit 122 is returned with no subsequent processes being executed. When the control unit 122 has judged that the vehicle speed change is +4 km/h per second or more, the processing by the control unit 122 proceeds to Step S705.

At Step S705, based on the fact that all the conditions judged at Step S702 to Step S704 have been satisfied, the control unit 122 judges that the current traveling condition is the steep downward slope descending condition, and the processing by the control unit 122 is returned. At this time, the control unit 122 acquires from the vehicle condition parameter storing unit 121 the hard/easy parameter change amount (adding/subtracting value) corresponding to the steep downward slope descending condition (Step S4 in FIG. 8), and then carries out an operation with the use of the current biological representation coordinates of the current biological representation data holding unit 119 and the hard/easy parameter change amount (adding/subtracting value) (Step S5). At this time, [+2] which is the hard/easy parameter change amount (adding/subtracting value) corresponding to the steep downward slope descending condition, is acquired from the hard/easy parameter table 500 shown in FIG. 6, and is then added to the current biological representation coordinates.

Figure 12:
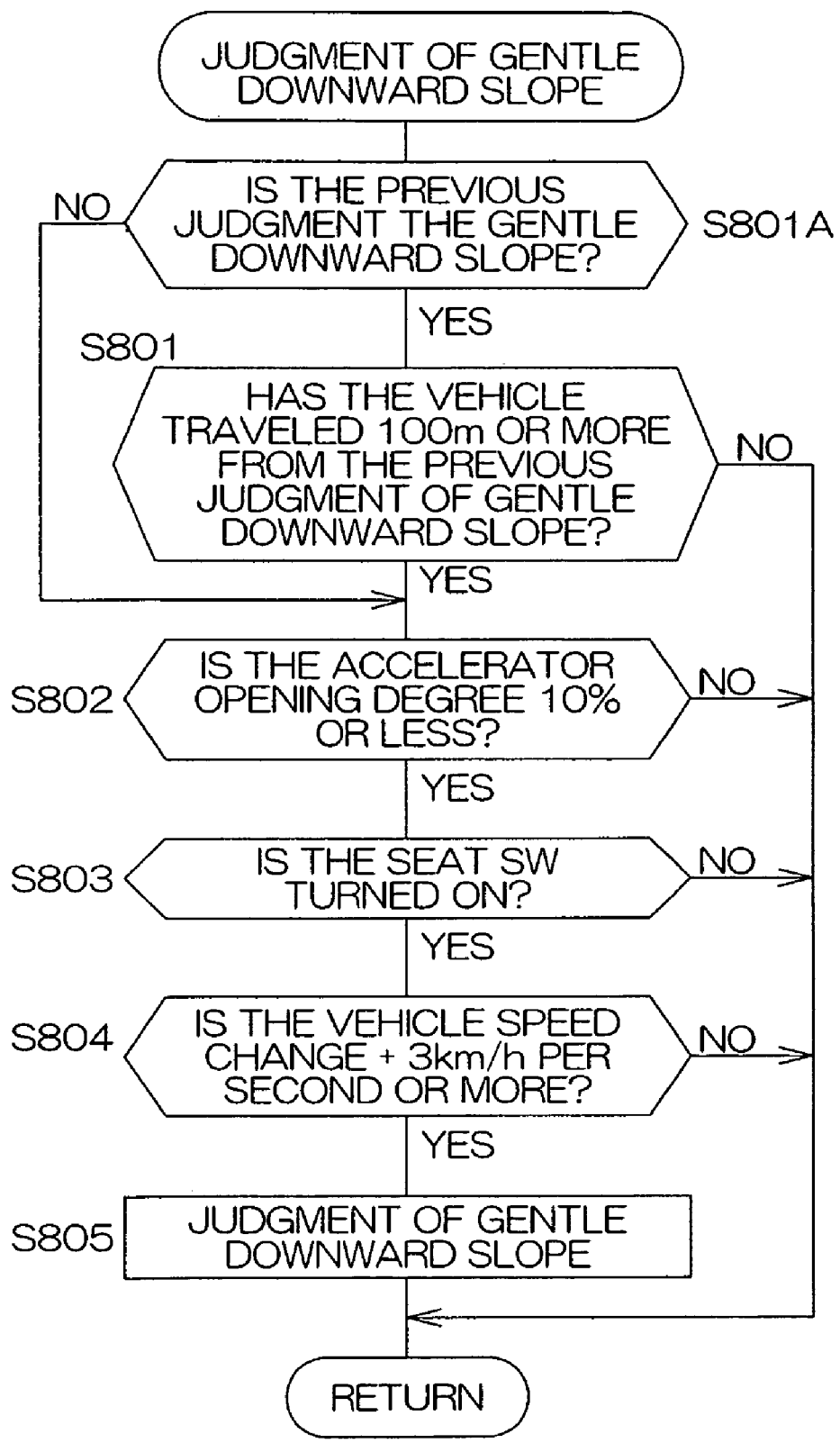
FIG. 12 is a flow chart illustrating a gentle downward slope traveling condition judging processing.

FIG. 12 is a flow chart for illustrating the processing of judging the gentle downward slope descending condition (Step S13 in FIG. 9). First, the control unit 122 judges whether or not the result of the traveling condition judging processing at the previous control cycle was the gentle downward slope descending condition (Step S801A). When it has been judged that the previous traveling condition was the gentle downward slope descending condition, the control unit 122 judges, by referring to the traveling distance meter 130, whether or not the vehicle 100 has traveled 100 meters or more from that judgment time (Step S801). When it has been judged that the previous traveling Condition was not the gentle downward slope descending condition, the control unit 122 executes a judging processing of the gentle downward slope descending condition even though the vehicle 100 has not traveled 100 meters or more (NO at Step S801A). When the previous traveling condition was the gentle downward slope descending condition (YES at Step S801A) but the traveling distance from that judgment has not reached 100 meters (NO at Step S801), the processing by the control unit 122 is returned with no subsequent processes being executed. The object of Step S801 is similar to that of Step S601.

When the control unit 122 has judged that the vehicle 100 has traveled 100 meters or more from the previously judged traveling condition or the gentle downward slope descending condition (YES at Step S801), the processing by the control unit 122 proceeds to Step S802. At Step S802, the control unit 122 judges, based on the accelerator opening degree detecting signal entered from the accelerator opening degree detecting unit 106, whether or not the accelerator opening degree is 10% or less, for example. When the control unit 122 has judged that the accelerator opening degree was not 10% or less, the processing by the control unit 122 is returned with no subsequent processes being executed. When the control unit 122 has judged that the accelerator opening degree was 10% or less, the processing by the control unit 122 proceeds to Step S803.

At Step S803, the control unit 122 judges, based on the seat ON/OFF signal entered from the seat switch 105, whether or not the seat switch 105 is turned ON. When the control unit 122 has judged that the seat switch 105 is turned OFF, the processing by the control unit 122 is returned with no subsequent processes being executed. When the control unit 122 has judged that the seat switch 105 is turned ON, the processing by the control unit 122 proceeds to Step S804.

At Step S804, the control unit 122 judges, based on the speed detecting signal entered from the speed detecting unit 108, whether or not the vehicle speed change is +3 km/h per second or more, for example. When the control unit 122 has judged that the vehicle speed change is not +3 km/h per second or more, the processing by the control unit 122 is returned with no subsequent processes being executed. When the control unit 122 has judged that the vehicle speed change is +3 km/h per second or more, the processing by the control unit 122 proceeds to Step S805.

At Step S805, based on the fact that all the conditions judged at Step S802 to Step S804 have been satisfied, the control unit 122 judges that the current traveling condition is the gentle downward slope descending condition, and the processing by the control unit 122 is returned. The control unit 122 acquires, from the vehicle condition parameter storing unit 121, the hard/easy parameter change amount (adding/subtracting value) corresponding to the gentle downward slope descending condition (Step S4 in FIG. 8), and then carries out an operation with the use of the current biological representation coordinates of the current biological representation data holding unit 119 and the hard/easy parameter change amount (adding/subtracting value) (Step S5). At this time, [+1] which is the hard/easy parameter change amount (adding/subtracting value) corresponding to the gentle downward slope descending condition, is acquired from the hard/easy parameter table 500 shown in FIG. 6, and is then added to the current biological representation coordinates.

Figure 13:
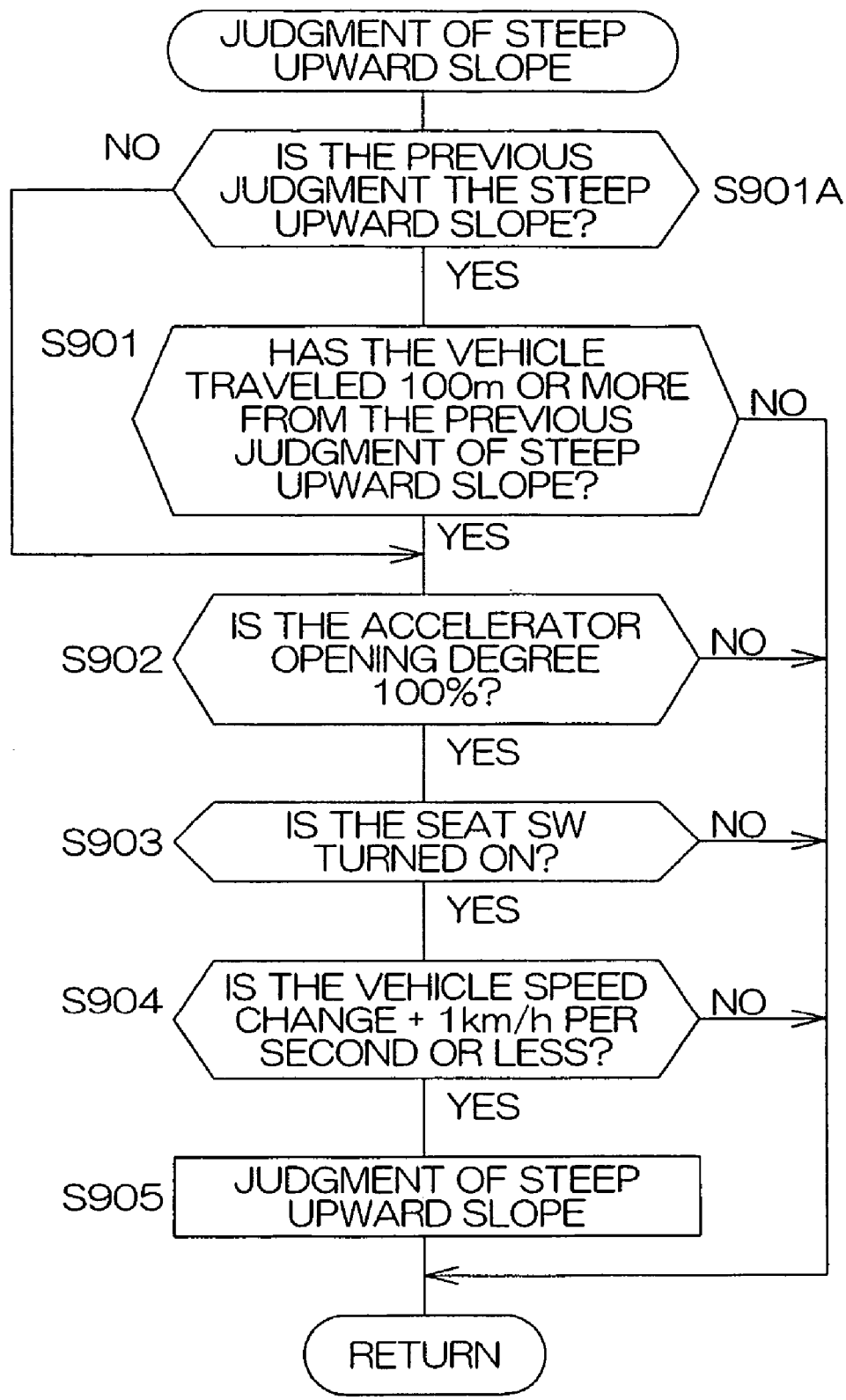
FIG. 13 is a flow chart illustrating a steep upward slope traveling condition judging processing.

FIG. 13 is a flow chart for illustrating the processing of judging the steep upward slope ascending condition (Step S14 in FIG. 9). First, the control unit 122 judges whether or not the result of the traveling condition judging processing at the previous control cycle was the steep upward slope ascending condition (StepS901A). When it has been judged that the previous traveling condition was the steep upward slope ascending condition, the control unit 122 judges, by referring to the traveling distance meter 130, whether or not the vehicle 100 has traveled 100 meters or more from that judgment time (Step S901). When it has been judged that the previous traveling condition was not the steep upward slope ascending condition (NO at Step S901A), the control unit 122 executes a process of judging whether or not the vehicle 100 is in the steep upward slope ascending condition even though the vehicle 100 has not traveled 100 meters or more. When the previous traveling condition was the steep upward slope ascending condition (YES at Step S901A) but the traveling distance from that judgment has not reached 100 meters (NO at Step S901), the processing by the control unit 122 is returned with no subsequent processes being executed. The object of Step S901 is similar to that of Step S601.

When the control unit 122 has judged that the vehicle 100 has traveled 100 meters or more from the previously judged traveling condition or the steep upward slope ascending condition (YES at StepS901), the processing by the control unit 122 proceeds to Step S902. At Step S902, the control unit 122 judges, based on the accelerator opening degree detecting signal entered from the accelerator opening degree detecting unit 106, whether or not the accelerator opening degree is 100%. When the control unit 122 has judged that the accelerator opening degree is not 100%, the processing by the control unit 122 is returned with no subsequent processes being executed. When the control unit 122 has judged that the accelerator opening degree is 100%, the processing by the control unit 122 proceeds to Step S903.

At Step S903, the control unit 122 judges, based on the seat ON/OFF signal entered from the seat switch 105, whether or not the seat switch 105 is turned ON. When the control unit 122 has judged that the seat switch 105 is turned OFF, the processing by the control unit 122 is returned with no subsequent processes being executed. When the control unit 122 has judged that the seat switch 105 is turned ON, the processing by the control unit 122 proceeds to Step S904.

At Step S904, the control unit 122 judges, based on the speed detecting signal entered from the speed detecting unit 108, whether or not the vehicle speed change is +1 km/h per second or less, for example. When the control unit 122 has judged that the vehicle speed change is not +1 km/h per second or less, the processing by the control unit 122 is returned with no subsequent processes being executed. When the control unit 122 has judged that the vehicle speed change is +1 km/h per second or less, the processing by the control unit 122 proceeds to Step S905.

At Step S905, based on the fact that all the conditions judged at Step S902 to Step S904 have been satisfied, the control unit 122 judges that the current traveling condition is the steep upward slope ascending condition, and the processing by the control unit 122 is then returned. The control unit 122 acquires from the vehicle condition parameter storing unit 121 the hard/easy parameter change amount (adding/subtracting value) corresponding to the steep upward slope ascending condition (Step S4 in FIG. 8), and then carries out an operation with the use of the current biological representation coordinates of the current biological representation data holding unit 119 and the hard/easy parameter change amount (adding/subtracting value) (Step S5). At this time, [−2] which is the hard/easy parameter change amount (adding/subtracting value) corresponding to the steep upward slope ascending condition, is acquired from the hard/easy parameter table 500 shown in FIG. 6, and is then added to the current biological representation coordinates.

Figure 14:
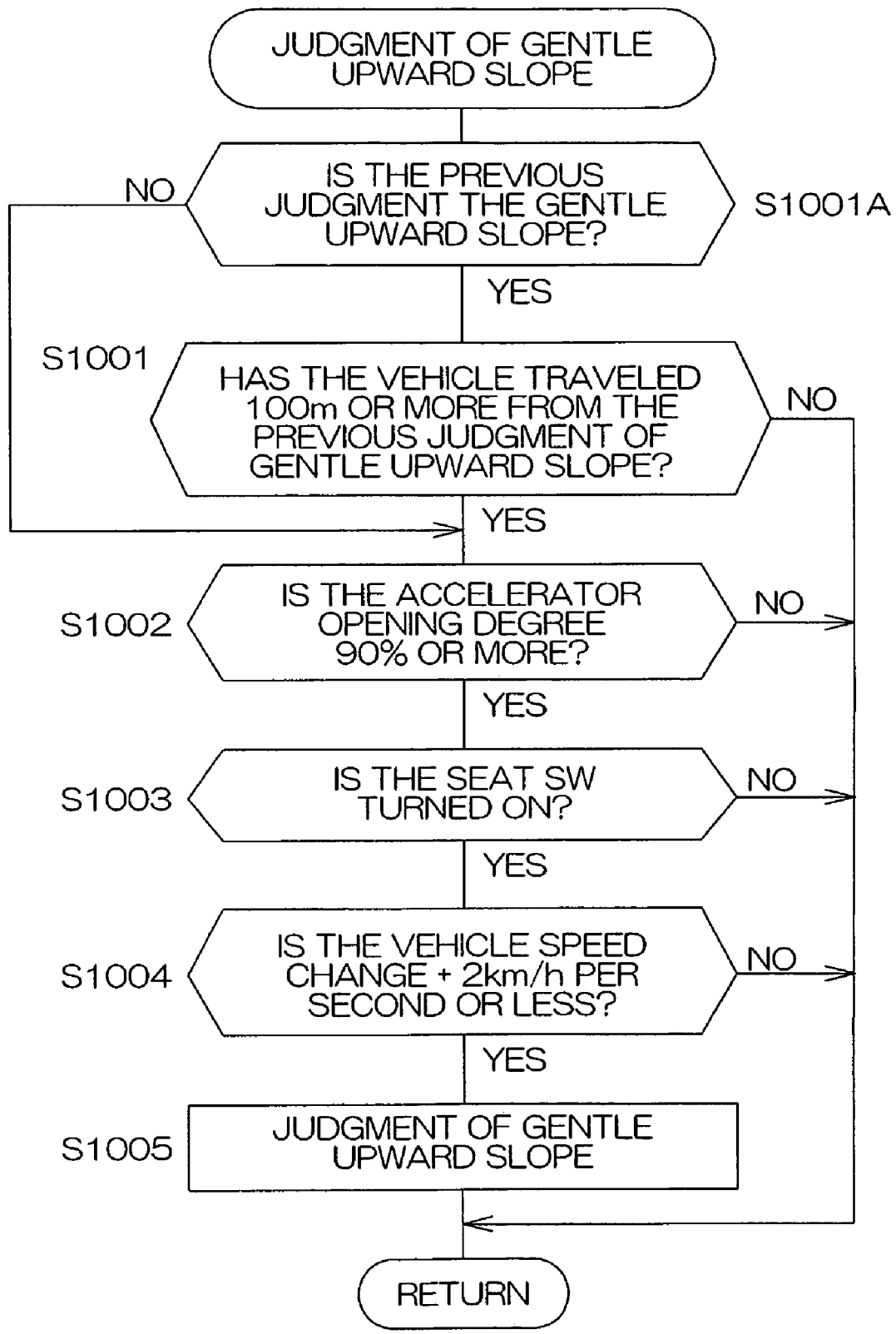
FIG. 14 is a flow chart illustrating a gentle upward slope traveling condition judging processing.

FIG. 14 is a flow chart for illustrating the processing of judging the gentle upward slope ascending condition (Step S15 in FIG. 9). First, the control unit 122 judges whether or not the result of the traveling condition judging processing at the previous control cycle was the gentle upward slope ascending condition (Step S1001A). When it has been judged that the previous traveling condition was the gentle upward slope ascending condition, the control unit 122 judges, by referring to the traveling distance meter 130, whether or not the vehicle 100 has traveled 100 meters or more from that judgment time (Step S1001). When it has been judged that the previous traveling condition was not the gentle upward slope ascending condition (NO at Step S1001A), the control unit 122 executes a process of judging whether or not the vehicle 100 is in the gentle upward slope ascending condition even though the vehicle 100 has not traveled 100 meters or more. When the previous traveling condition was the gentle upward slope ascending condition (YES at Step S1001A) but the traveling distance from that judgment has not reached 100 meters (NO at Step S1001), the processing by the control unit 122 is returned with no subsequent processes being executed. The object of Step S1001 is similar to that of Step S601.

When the control unit 122 has judged that the vehicle 100 has traveled 100 meters or more from the previously judged traveling condition or the gentle upward slope ascending condition (YES at Step S1001), the processing by the control unit 122 proceeds to Step S1002. At Step S1002, the control unit 122 judges, based on the accelerator opening degree detecting signal entered from the accelerator opening degree detecting unit 106, whether or not the accelerator opening degree is 90% or more. When the control unit 122 has judged that the accelerator opening degree is not 90% or more, the processing by the control unit 122 is returned with no subsequent processes being executed. When the control unit 122 has judged that the accelerator opening degree is 90% or more, the processing by the control unit 122 proceeds to Step S1003.

At Step S1003, the control unit 122 judges, based on the seat ON/OFF signal entered from the seat switch 105, whether or not the seat switch 105 is turned ON. When the control unit 122 has judged that the seat switch 105 is turned OFF, the processing by the control unit 122 is returned with no subsequent processes being executed. When the control unit 122 has judged that the seat switch 105 is turned ON, the processing by the control unit 122 proceeds to Step S1004.

At Step S1004, the control unit 122 judges, based on the speed detecting signal entered from the speed detecting unit 108, whether or not the vehicle speed change is +2 km/h per second or less, for example. When the control unit 122 has judged that the vehicle speed change is not +2 km/h per second or less, the processing by the control unit 122 is returned with no subsequent processes being executed. When the control unit 122 has judged that the vehicle speed change is +2 km/h per second or less, the processing by the control unit 122 proceeds to Step S1005.

At Step S1005, based on the fact that all the conditions judged at Step S1002 to Step S1004 have been satisfied, the control unit 122 judges that the current traveling condition is the gentle upward slope ascending condition, and the processing by the control unit 122 is returned. The control unit 122 acquires from the vehicle condition parameter storing unit 121 the hard/easy parameter change amount (adding/subtracting value) corresponding to the gentle upward slope ascending condition (Step S4 in FIG. 8), and then carries out an operation with the use of the current biological representation coordinates of the current biological representation data holding unit 119 and the hard/easy parameter change amount (adding/subtracting value) (Step S5). At this time, [−1] which is the hard/easy parameter change amount (adding/subtracting value) corresponding to the gentle upward slope ascending condition, is acquired from the hard/easy parameter table 500 shown in FIG. 6, and is then added to the current biological representation coordinates.

Figure 15:
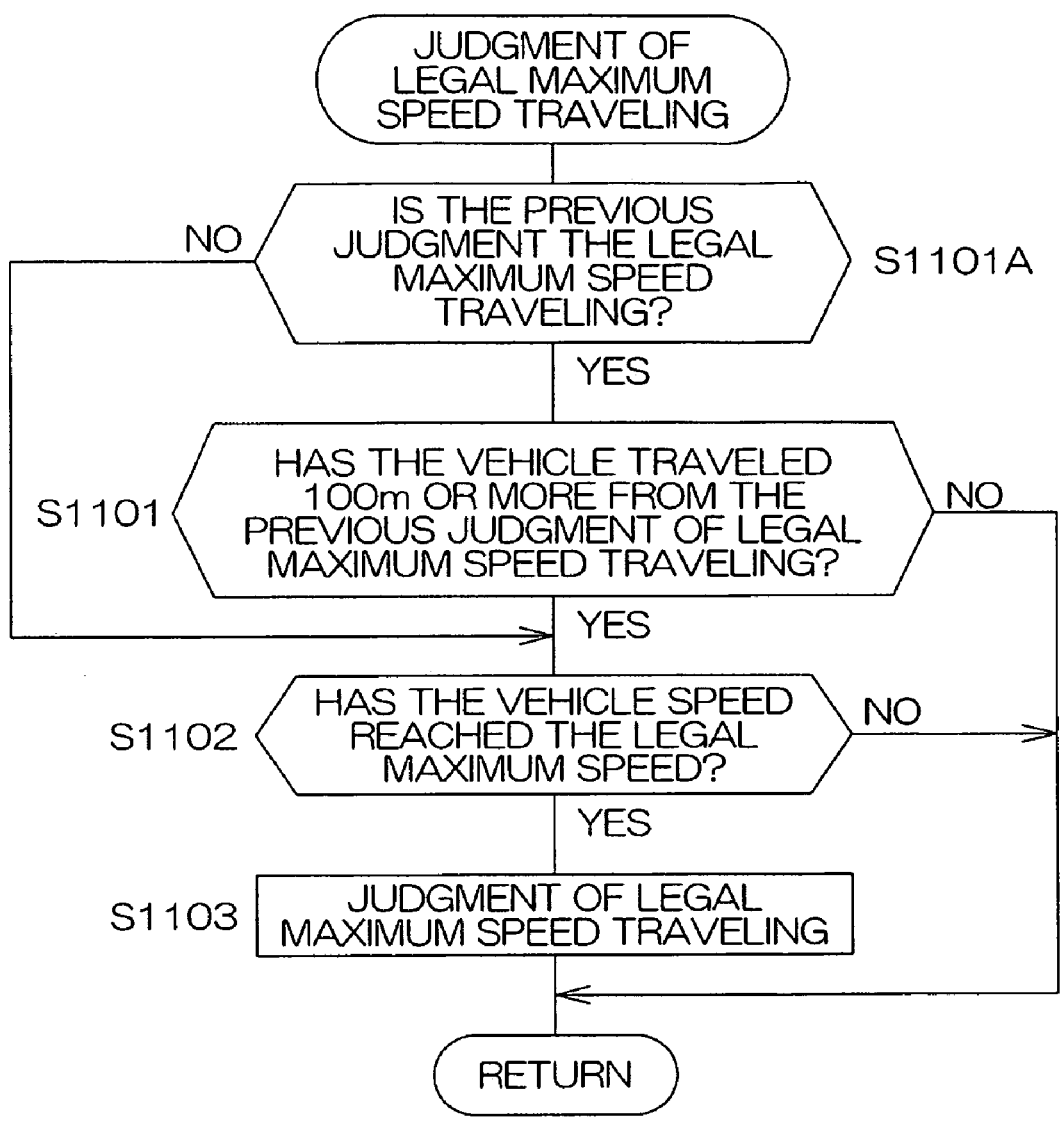
FIG. 15 is a flow chart illustrating a legal maximum speed judging processing.

FIG. 15 is a flow chart for illustrating the processing of judging whether or not the vehicle 100 is traveling at a legal maximum speed (Step S16 in FIG. 9). First, the control unit 122 judges whether or not the result of the traveling condition judging processing at the previous control cycle was the legal maximum speed (Step S1101A). When it has been judged that the previous traveling condition was the legal maximum speed, the control unit 122 judges, by referring to the traveling distance meter 130, whether or not the vehicle 100 has traveled 100 meters or more from that judgment time (Step S1101). When it has been judged that the previous traveling condition was not the legal maximum speed (NO at Step S1101A), the control unit 122 executes a process of judging whether or not the vehicle 100 is in the legal maximum speed even though the vehicle 100 has not traveled 100 meters or more. When the previous traveling condition was the legal maximum speed (YES at Step S1101A) but the traveling distance from that judgment has not reached 100 meters (NO at Step S1101), the processing by the control unit 122 is returned with no subsequent processes being executed. The object of Step S1101 is similar to that of Step S601.

When the control unit 122 has judged that the vehicle 100 has traveled 100 meters or more from the previously judged traveling condition or the legal maximum speed condition (YES at Step S1101), the processing by the control unit 122 proceeds to Step S1102. At Step S1102, the control unit 122 judges, based on the speed detecting signal entered from the speed detecting unit 108, whether or not the speed of the vehicle 100 has reached the legal maximum speed (e.g., about 30 km/h). When the control unit 122 has judged that the vehicle 100 speed has not reached the legal maximum speed, the processing by the control unit 122 is returned with no subsequent processes being executed. When the control unit 122 has judged that the vehicle 100 speed has reached the legal maximum speed, the processing by the control unit 122 proceeds to Step S1103.

At Step S1103, based on the fact that the condition judged at Step S1102 has been satisfied, the control unit 122 judges that the current traveling condition is the legal maximum speed condition, and the processing by the control unit 122 is returned. At this time, the control unit 122 acquires from the vehicle condition parameter storing unit 121 the hard/easy parameter change amount (adding/subtracting value) corresponding to the legal maximum speed (Step S4 in FIG. 8), and then carries out an operation with the use of the current biological representation coordinates of the current biological representation data holding unit 119 and the hard/easy parameter change amount (adding/subtracting value) (Step S5). At this time, [−2] which is the hard/easy parameter change amount (adding/subtracting value) corresponding to the legal maximum speed, is acquired from the hard/easy parameter table 500 shown in FIG. 6, and is then added to the current biological representation coordinates.

FIG. 16 is a flow chart for illustrating the image display processing (Step S7 in FIG. 8). At step S1601, by referring to the previous biological representation coordinates in the current biological representation data holding unit 119, the control unit 122 judges whether or not the generated current biological representation coordinates (Step S5 in FIG. 8) have changed from the previous coordinates. When the control unit 122 has judged that the current biological representation coordinates have not changed from the previous ones, the processing by the control unit 122 is returned with no subsequent processes being executed. When the control unit 122 has judged that the current biological representation coordinates have changed from the previous ones, the processing by the control unit 122 proceeds to Step S1602.

At Step S1602, the control unit 122 acquires, from the current biological representation data holding unit 119, the current biological representation coordinate values, i.e., the coordinate values obtained by adding the comfort/anxiety parameter change amounts (adding/subtracting values) and the hard/easy parameter change amounts (adding/subtracting values) to the previous biological representation coordinate values. Then, the processing by the control unit 122 proceeds to Step S1603. At Step S1603, the control unit 122 specifies, based on the current biological representation coordinate values obtained at Step S1602, the corresponding image data number out of the biological representation coordinates-display image table 300, shown in FIG. 4, stored in the biologically displayed image corresponding data storing unit 120. Then, the processing by the control unit 122 proceeds to Step S1604.

At Step S1604, the control unit 122 reads out, based on the image data number specified at Step S1603, the corresponding audio image data from the audio image data storing unit 118. The control unit 122 supplies the audio data to the sound output driver 123 and the image data to the display driver 125. Then, the processing by the control unit 122 is returned.

In the foregoing, the description has been made that the image display processing is executed when the biological representation coordinates have changed, but provision may be made such that the image display processing is executed regularly or at predetermined cycles independently from changes in biological representation coordinates.

Display examples of image data will be discussed with reference to FIG. 17A to FIG. 17D, FIG. 18A and FIG. 18B, FIG. 19A to FIG. 19C, and FIG. 20A and FIG. 20B.

FIG. 17A to FIG. 17D show examples of displaying, corresponding to changes in the traveling condition of the hybrid vehicle 100, images representing the hard/easy condition. FIG. 17A represents, in the form of a display image in which a spherical body repeatedly expands and contracts quickly, the "hard" condition due to the continuation of the steep upward slope ascending condition as the traveling condition of the hybrid vehicle 100. This representation is compared to the image in which the heart of an animal (living matter) expands and contracts in short cycles. FIG. 17B represents, in the form of a display image in which a spherical body repeatedly expands and contracts slowly, the "easy" condition due to the continuation of the steep downward slope descending condition as the traveling condition of the hybrid vehicle 100. This representation is compared to the image in which the heart of an animal expands and contracts in long cycles.

FIG. 17C represents the "hard" condition, similar to that shown in FIG. 17A, in the form of a display image in which a large spherical body repeatedly expands and contracts quickly. FIG. 17D represents the "easy" condition, similar to that shown in FIG. 17B, in the form of a display image in which a small spherical body repeatedly expands and contracts slowly.

As discussed in the foregoing, the level of the hard/easy condition can be displayed as compared to living matter by changing the spherical body size and the expansion/contraction cycle.

Figure 18A:
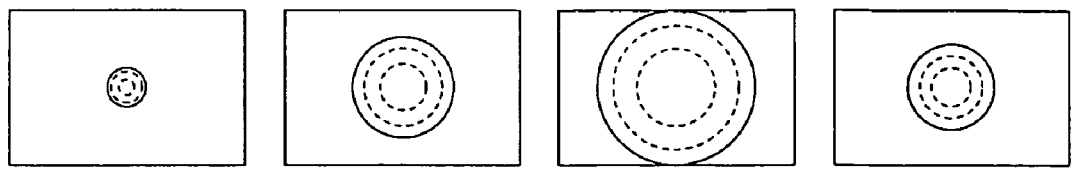
FIG. 18A and FIG. 18B are views illustrating other examples of image display corresponding to the hard/easy condition.
Figure 18B:
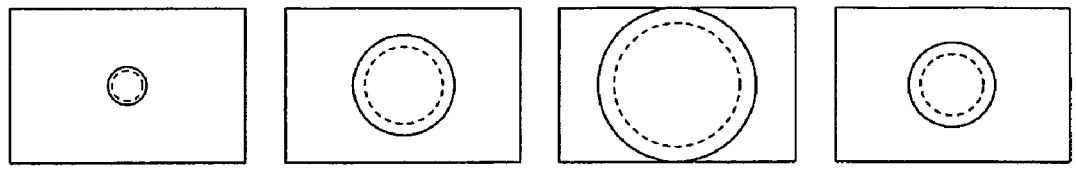

FIG. 18A and FIG. 18B show other examples of displaying, corresponding to changes in the traveling condition of the hybrid vehicle 100, images representing the hard/easy condition. FIG. 18A represents the "easy" condition, similar to that shown in FIG. 17B, in the form of a display image in which a spherical body bounds in the back and forth direction. FIG. 18B represents the "hard" condition, similar to that shown in FIG. 17A, in the form of a display image in which a circle body repeatedly flickers in the form of a ring at short cycles.

In such representations, too, the hard/easy condition of the hybrid vehicle 100 is compared to the activities (changes in form or movement) of living matter.

FIG. 19A to FIG. 19C show examples of displaying, corresponding to changes in the vehicle condition of the hybrid vehicle 100, images representing the anxious/comfortable/normal conditions. FIG. 19A represents, in the form of a display image in which a red spherical body repeatedly expands and contracts, the "anxious" condition for example when the luminous intensity sensor 116 detects, as the vehicle condition of the hybrid vehicle 100, that the surrounding area is dark. FIG. 19B represents, in the form of a display image in which a blue spherical body repeatedly expands and contracts, the "comfortable" condition for example when the touch sensor 111 detects, as the vehicle condition of the hybrid vehicle 100, that the vehicle has been stroked. FIG. 19C represents, in the form of a display image in which a light blue spherical body repeatedly expands and contracts, the "normal" condition for example when the GPS control unit 102 detects, as the vehicle condition of the hybrid vehicle 100, that the traveling area is an often traveled area. Such a color display appears on the screen together with the expansion/contraction of the spherical body.

It can be said that such a representation expresses the comfort/anxiety condition as compared to living matter of which color undergoes a change.

FIG. 20A and FIG. 20B are examples of displaying, corresponding to changes in the vehicle condition of the hybrid vehicle 100, images representing the anxiety condition. FIG. 20A represents, in the form of a display image in which a spherical body repeats a circular movement on a large orbit, a "strong anxiety" condition for example when the GPS control unit 102 has detected, as the vehicle condition of the hybrid vehicle 100, that this is an area in which the hybrid vehicle 100 has never traveled. FIG. 20B represents, in the form of a display image in which a spherical body repeats a circular movement on a small orbit, a "weak anxiety" condition for example when the fuel SHORT detecting unit 113 has detected, as the vehicle condition of the hybrid vehicle 100, that the gasoline residual quantity is low.

It can be said that such a representation visually expresses the vehicle condition as compared to the behaviors of living matter such as a small animal.

The display examples in FIG. 19A to FIG. 19C and FIG. 20A and FIG. 20B are images based on the biological representation coordinates on the comfort/anxiety axis set corresponding to changes in vehicle condition. These image displays can be made by the vehicle condition detecting processing (Step S2 in FIG. 8) is executed, in the control unit 122, based on the detecting signals entered from the GPS control unit 102, the detecting units 106–109 and 112–115, the switches 103–105, and the sensors 110, 111, 116.

Combinations of the display modes shown in FIGS. 17A–17D or FIGS. 18A–18B and those shown in FIGS. 19A–19C or FIGS. 20A–20B enable simultaneous representation of the hard/easy condition and the comfort/anxiety condition. For example, the display modes shown in FIGS. 17A–17D are combinable with the color representation shown in FIGS. 19A–19C.

The image display examples in FIG. 17A to FIG. 17D, FIG. 18A and FIG. 18B, FIG. 19A to FIG. 19C and FIG. 20A and FIG. 20B, preferably include no audio representation. In at least one preferred embodiment of the present invention, however, the data includes audio image data. Accordingly, provision may be made such that the speaker 124 reproduces a sound corresponding to each of the display images.

As discussed in the foregoing, the hybrid vehicle 100 of the various preferred-embodiments of the present invention is arranged such that both the vehicle condition and traveling condition of the hybrid vehicle 100 are detected or judged based on the detecting signals entered from the GPS control unit 102, the detecting units 106–109 and 112–115, the switches 103–105, and the sensors 110, 111, 116. Then, the biological representation parameter change amounts (adding/subtracting values) corresponding to the current traveling condition and vehicle condition thus detected or judged are obtained from the vehicle condition parameter storing unit 121 and then added (substantially subtracted when the parameter change amount is a negative value) to the previous biological representation coordinates held in the current biological representation data holding unit 119. Thus, the biological representation coordinates corresponding to the current traveling condition and/or the current vehicle condition are determined, and the image corresponding to the biological representation coordinates thus determined is displayed.

According to the arrangement above-mentioned, the levels of the comfort/anxiety and hard/easy conditions in which the past record has been reflected, can be expressed in the form of an image at the image display unit 126 and in the form of a sound by the speaker 124. More specifically, the biological representation parameter shows changes in behavior similar to the feeling of a living thing (in particular, an animal such as a human being or the like). This enables the vehicle user to feel the vehicle itself as a pseudo-living matter, thus enabling the vehicle owner of the hybrid vehicle 100 to become personally and emotionally attached to the hybrid vehicle 100.

Further, the hybrid vehicle 100 of preferred embodiments can display a biological representation image according to changes in traveling condition and/or vehicle condition. This also enables the vehicle condition to be expressed like the feeling of a pseudo-living matter, thus enabling the vehicle owner to have an affinity toward the vehicle 100.

Each of the traveling condition judging processing and the image display processing executed by the control unit 122 is preferably performed by a simple program. Thus, the processing load exerted on the control unit 122 can be reduced. Further, the image data in the examples above-mentioned are preferably abstract or symbolic images such as a spherical body or the like, and are displayed only with their shape and color being changed. This also reduces the display processing load.

Unlike in the arrangement in which an agent is displayed on the screen, the display of an abstract image representing a vital force can provide the vehicle owner or driver/rider the impression that the vehicle 100 itself is a living matter. This enables the vehicle owner or driver/rider to become personally and emotionally attached to the vehicle 100.

Further, the hybrid vehicle 100 is quieter in traveling noise than an engine vehicle. Thus, the audio image biological representation corresponding to the vehicle condition can be demonstrated more effectively.

In the series-type hybrid vehicle 100 of the present preferred embodiment, the drive force generated solely by the electromotor 4 serves as a drive source, and the engine 1 plays a role only of rotating the generator motor 2, and its drive force is not transmitted to the traveling wheel. Accordingly, the hybrid vehicle 100 is less powerful than an engine vehicle. Therefore, the image representation of hard/easy feelings expresses the condition of the hybrid vehicle 100 more precisely, enabling the user (particularly, the owner) to effectively have an affinity toward the vehicle 100.

In the foregoing, although the description has been made of a preferred embodiment of the present invention, the present invention may be embodied in many other forms. For example, the description has been made of the arrangement in which the present invention has been applied to the series-type hybrid vehicle 100. However, the present invention may also be applied to a parallel-type hybrid vehicle arranged such that both the drive force of an engine and the drive force of an electromotor are transmitted to a traveling wheel. The present invention can also be applied to an engine vehicle arranged such that the drive force of the engine is solely transmitted to the traveling wheel. When the present invention is applied to an engine vehicle, the audio image representation corresponding to the vehicle condition may be arranged in a manner different from that above-mentioned.

In the preferred embodiment above-mentioned, a judgment of the condition of traveling on a steep downward slope, a gentle downward slope, a gentle upward slope, or a steep upward slope, is made preferably based on the accelerator opening degree, the seat switch ON/OFF state and the vehicle speed change. However, such a judgment may be made with the use of an output of the acceleration sensor 110.

The judging conditions are not limited to those shown in the traveling condition judging processing, but may suitably be changed according to the type of a vehicle to which the present invention is applied.

Further, the image display unit 126 may serve as a meter panel for displaying the speed, the residual fuel quantity, the trip meter data and the like.

Although preferred embodiments of the present invention have been discussed in detail, these preferred embodiments are merely specific examples for clarifying the technical contents of the present invention. Therefore, the present invention should not be construed as being limited in any way to these specific examples. The spirit and scope of the present invention are limited only by the appended claims.

This Application corresponds to Japanese Patent Application No. 2004-006986 filed with the Japanese Patent Office on Jan. 14, 2004, the full disclosure of which is incorporated herein by reference.

What is claimed is:

1. A vehicle image display apparatus comprising:
    a traveling condition judging unit that is arranged to repeatedly judge a traveling condition of a vehicle;
    an operating unit that is arranged to generate, based on a previous traveling condition of the vehicle and a current traveling condition corresponding to an adding/subtracting value currently judged by the traveling condition judging unit, a parameter for abstractly representing a traveling condition of the vehicle; and
    a display unit that is arranged to display, based on the parameter generated by the operating unit, an image which abstractly represents the traveling condition of the vehicle.

2. A vehicle image display apparatus according to claim 1, wherein the apparatus further comprises a vehicle condition detecting unit that is arranged to detect a vehicle condition, and the traveling condition judging unit is arranged to judge the traveling condition of the vehicle based on the vehicle condition detected by the vehicle condition detecting unit.

3. A vehicle image display apparatus according to claim 2, wherein the vehicle condition detecting unit includes at least one of an accelerator sensor that is arranged to detect an operational state of an accelerator, a speed sensor that is arranged to detect a vehicle speed, an acceleration sensor that is arranged to detect a vehicle acceleration, and a seat sensor that is arranged to detect whether a crew member has taken his/her seat in the vehicle.

4. A vehicle image display apparatus according to claim 1, wherein the apparatus further comprises a vehicle condition detecting unit that is arranged to repeatedly detect a vehicle condition;
    the operating unit is arranged to generate, based on a previous vehicle condition and a current vehicle condition currently detected by the vehicle condition detecting unit, a parameter for abstractly representing the vehicle condition; and the display unit is arranged to display, based on the traveling condition representing parameter and the vehicle condition representing parameter which have been generated by the operating unit, an image which abstractly represents the vehicle condition and traveling condition of the vehicle.

5. A vehicle image display apparatus according to claim 4, wherein the vehicle condition representing parameter includes a comfort/anxiety parameter representing a comfort/anxiety condition, the apparatus further comprises a comfort/anxiety parameter change amount setting unit that is arranged to set a comfort/anxiety parameter change amount corresponding to the vehicle condition detected by the vehicle condition detecting unit, the operating unit is arranged to acquire, from the comfort/anxiety parameter change amount setting unit, the comfort/anxiety parameter change amount corresponding to the current vehicle condition detected by the vehicle condition detecting unit, and then use the comfort/anxiety parameter change amount thus acquired and a previous comfort/anxiety parameter to generate a comfort/anxiety parameter representing the current vehicle condition, and the display unit is arranged to display a vehicle comfort/anxiety condition representing image based on the comfort/anxiety parameter generated by the operating unit.

6. A vehicle image display apparatus according to claim 5, wherein the vehicle condition detecting unit includes at least one of a touch sensor that is arranged to detect a contact with a vehicle at a predetermined portion thereof, a traveling record detecting unit that is arranged to detect a traveling record of the vehicle, a luminous intensity sensor that is arranged to detect a brightness around the vehicle, a fuel FULL detecting unit that is arranged to detect that a vehicle fuel tank is fully charged with fuel, a fuel SHORT detecting unit that is arranged to detect that a fuel residual quantity in the vehicle fuel tank is less than a predetermined amount, and a fall detecting unit that is arranged to detect that the vehicle has fallen.

7. A vehicle image display apparatus according to claim 1, wherein the parameter for abstractly representing the traveling condition of the vehicle includes a hard/easy parameter representing a hard/easy condition, the apparatus further comprises a hard/easy parameter change amount setting unit that is arranged to set a hard/easy parameter change amount corresponding to the traveling condition judged by the traveling condition judging unit, the operating unit is arranged to acquire from the hard/easy parameter change amount setting unit the hard/easy parameter change amount corresponding to the current traveling condition judged by the traveling condition judging unit and the adding/subtracting value, and then use the hard/easy parameter change amount thus acquired and a previous hard/easy parameter to generate a hard/easy parameter representing the current traveling condition, and the display unit is arranged to display a vehicle hard/easy condition representing image based on the hard/easy parameter generated by the operating unit.

8. A vehicle image display apparatus according to claim 7, wherein the traveling condition judged by the traveling condition judging unit includes at least one of a pushing and walking condition, a downward slope traveling condition, an upward slope traveling condition, and a legal maximum speed condition.

9. A vehicle image display apparatus comprising:

a vehicle condition detecting unit that is arranged to repeatedly detect a vehicle condition;

an operating unit that is arranged to generate, based on a previous vehicle condition and a current vehicle condition corresponding to an adding/subtracting value currently detected by the vehicle condition detecting unit, a parameter for abstractly representing the vehicle condition; and a display unit that is arranged to display, based on the parameter generated by the operating unit, an image which abstractly represents the vehicle condition.

10. A vehicle image display apparatus according to claim 9, wherein the vehicle condition representing parameter includes a comfort/anxiety parameter representing a comfort/anxiety condition, the apparatus further comprises a comfort/anxiety parameter change amount setting unit that is arranged to set a comfort/anxiety parameter change amount corresponding to the vehicle condition detected by the vehicle condition detecting unit, the operating unit is arranged to acquire, from the comfort/anxiety parameter change amount setting unit, the comfort/anxiety parameter change amount corresponding to the current vehicle condition detected by the vehicle condition detecting unit and the adding/subtracting value, and then use the comfort/anxiety parameter change amount thus acquired and a previous comfort/anxiety parameter to generate a comfort/anxiety parameter representing the current vehicle condition, and the display unit is arranged to display a vehicle comfort/anxiety condition representing image based on the comfort/anxiety parameter generated by the operating unit.

11. A vehicle image display apparatus according to claim 9, wherein the vehicle condition detecting unit includes at least one of a touch sensor that is arranged to detect a contact with a vehicle, a traveling record detecting unit that is arranged to detect a traveling record of the vehicle, a luminous intensity sensor that is arranged to detect a brightness around the vehicle, a fuel FULL detecting unit that is arranged to detect that a vehicle fuel tank is fully charged with fuel, a fuel SHORT detecting unit that is arranged to detect that the fuel residual quantity in the vehicle fuel tank is less than a predetermined amount, and a fall detecting unit that is arranged to detect that the vehicle has fallen.

12. A vehicle comprising:

a traveling wheel;

a drive source that is arranged to transmit a drive force to the traveling wheel;

a traveling condition judging unit that is arranged to repeatedly judge a traveling condition of the vehicle;

an operating unit that is arranged to generate, based on a previous traveling condition of the vehicle and a current traveling condition corresponding to an adding/subtracting value currently judged by the traveling condition judging unit, a parameter for abstractly representing the traveling condition of the vehicle; and a display unit that is arranged to display, based on the parameter generated by the operating unit, an image which abstractly represents the traveling condition of the vehicle.

13. A vehicle according to claim 12, wherein the vehicle further comprises a vehicle condition detecting unit that is arranged to repeatedly detect a vehicle condition;
- the operating unit is arranged to generate, based on a previous vehicle condition and a current vehicle condition currently detected by the vehicle condition detecting unit, a parameter for abstractly representing the vehicle condition; and
- the display unit is arranged to display, based on the traveling condition representing parameter and the vehicle condition representing parameter which have been generated by the operating unit, an image which abstractly represents the traveling condition and vehicle condition of the vehicle.

14. A vehicle according to claim 12, wherein the drive source includes an electromotor.

15. A vehicle according to claim 13, further comprising:
- a battery that is arranged to supply an electric power to the electromotor;
- a generator that is connected to the battery and is arranged to charge the battery with electricity; and
- an engine that is arranged to drive the generator.

16. A vehicle comprising:
- a traveling wheel;
- a drive source that is arranged to transmit a drive force to the traveling wheel;
- a vehicle condition detecting unit that is arranged to repeatedly detect a vehicle condition;
- an operating unit that is arranged to generate, based on a previous vehicle condition and a current vehicle condition corresponding to an adding/subtracting value currently detected by the vehicle condition detecting unit, a parameter for abstractly representing the vehicle condition; and
- a display unit that is arranged to display, based on the parameter generated by the operating unit, an image which abstractly represents the vehicle condition.

* * * * *